US009825751B2

United States Patent
Takano et al.

(10) Patent No.: US 9,825,751 B2
(45) Date of Patent: Nov. 21, 2017

(54) COMMUNICATION CONTROL DEVICE, COMMUNICATION CONTROL METHOD, PROGRAM, TERMINAL DEVICE, AND COMMUNICATION CONTROL SYSTEM

(71) Applicant: Sony Corporation, Tokyo (JP)

(72) Inventors: Hiroaki Takano, Saitama (JP); Nishiki Mizusawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 103 days.

(21) Appl. No.: 14/409,628

(22) PCT Filed: May 22, 2013

(86) PCT No.: PCT/JP2013/064215
§ 371 (c)(1),
(2) Date: Dec. 19, 2014

(87) PCT Pub. No.: WO2014/006994
PCT Pub. Date: Jan. 9, 2014

(65) Prior Publication Data
US 2015/0156006 A1    Jun. 4, 2015

(30) Foreign Application Priority Data

Jul. 5, 2012 (JP) .................................. 2012-151239
Nov. 2, 2012 (JP) .................................. 2012-242544

(51) Int. Cl.
H04J 3/14        (2006.01)
H04L 5/14        (2006.01)
(Continued)

(52) U.S. Cl.
CPC .............. H04L 5/14 (2013.01); H04L 1/1854 (2013.01); H04L 5/0055 (2013.01);
(Continued)

(58) Field of Classification Search
USPC ....... 370/229, 252, 280, 281, 328, 329, 330, 370/335, 336
See application file for complete search history.

(56) References Cited

U.S. PATENT DOCUMENTS 8,452,240 B2    5/2013    Takahashi
8,533,370 B2    9/2013    Tanaka et al.
(Continued)

FOREIGN PATENT DOCUMENTS

EP    2753136 A1    7/2014
EP    2847895       3/2015
(Continued)

OTHER PUBLICATIONS

3GPP TSG RAN WG1 Meeting #69, May 21-25, 2012 "Dynamic reconfiguration of TDD UL-DL configuration".*
(Continued)

*Primary Examiner* — Kwang B Yao
*Assistant Examiner* — Nguyen Ngo
(74) *Attorney, Agent, or Firm* — Wolf, Greenfield & Sacks, P.C.

(57) ABSTRACT

Provided is a communication control device that controls radio communication conducted by one or more terminal devices according to a time-division duplex (TDD) scheme, the communication control device including a configuration section that configures, for each frame that includes a plurality of subframes, a link direction configuration expressing a link direction per subframe, and a control section that signals the link direction configuration configured by the configuration section to each terminal device. The configuration section configures a first link direction configuration for a first terminal group, and configures a second link direction configuration for a second terminal group, and the control section signals the first link direction
(Continued)

configuration to a terminal device belonging to the first terminal group on a first cycle, and signals the second link direction configuration to a terminal device belonging to the second terminal group on a second cycle that is shorter than the first cycle.

13 Claims, 25 Drawing Sheets

(51) Int. Cl.
   H04W 72/04       (2009.01)
   H04L 1/18        (2006.01)
   H04L 5/00        (2006.01)
   H04W 72/00       (2009.01)

(52) U.S. Cl.
   CPC ......... *H04L 5/1469* (2013.01); *H04W 72/005* (2013.01); *H04W 72/042* (2013.01); *H04W 72/0446* (2013.01)

(56) References Cited

U.S. PATENT DOCUMENTS

| | | | |
|---|---|---|---|
| 8,543,120 B2 | 9/2013 | Mizusawa | |
| 8,934,367 B2 | 1/2015 | Mizusawa et al. | |
| 8,995,942 B2 | 3/2015 | Watanabe | |
| 9,197,683 B2* | 11/2015 | Fwu | H04W 76/048 |
| 9,480,053 B2 | 10/2016 | Takano et al. | |
| 9,516,639 B2 | 12/2016 | Takano | |
| 9,538,548 B2 | 1/2017 | Mizusawa | |
| 9,544,780 B2 | 1/2017 | Takano | |
| 2008/0130526 A1 | 6/2008 | Che | |
| 2009/0249153 A1 | 10/2009 | Zhang | |
| 2009/0296609 A1* | 12/2009 | Choi | H04W 72/121 370/281 |
| 2009/0318177 A1* | 12/2009 | Wang | H04W 68/025 455/515 |
| 2011/0076965 A1 | 3/2011 | Takahashi | |
| 2011/0081870 A1 | 4/2011 | Watanabe | |
| 2011/0106984 A1 | 5/2011 | Tanaka et al. | |
| 2011/0244871 A1 | 10/2011 | Mizusawa | |
| 2012/0120854 A1 | 5/2012 | Zhang et al. | |
| 2012/0327821 A1* | 12/2012 | Lin | H04W 72/048 370/280 |
| 2013/0034001 A1 | 2/2013 | Mizusawa et al. | |
| 2013/0194980 A1* | 8/2013 | Yin | H04L 1/1854 370/280 |
| 2013/0272170 A1* | 10/2013 | Chatterjee | H04W 28/02 370/280 |
| 2013/0294359 A1 | 11/2013 | Lee | |
| 2013/0301490 A1* | 11/2013 | He | H04W 76/048 370/280 |
| 2013/0322235 A1* | 12/2013 | Khoryaev | H04W 24/10 370/229 |
| 2013/0336177 A1* | 12/2013 | Gao | H04W 72/0446 370/280 |
| 2014/0050107 A1* | 2/2014 | Charbit | H04W 72/1289 370/252 |
| 2014/0112254 A1* | 4/2014 | Lindoff | H04W 74/002 370/328 |
| 2014/0302867 A1 | 10/2014 | Mizusawa | |
| 2014/0307685 A1 | 10/2014 | Takano | |
| 2015/0043390 A1 | 2/2015 | Wang et al. | |
| 2015/0043392 A1* | 2/2015 | Susitaival | H04L 5/1469 370/280 |
| 2015/0110083 A1 | 4/2015 | Takano | |
| 2015/0117348 A1 | 4/2015 | Takano et al. | |
| 2015/0119064 A1 | 4/2015 | Takano | |
| 2015/0139108 A1 | 5/2015 | Takano | |
| 2015/0163815 A1* | 6/2015 | Lei | H04W 16/10 370/280 |
| 2015/0195064 A1 | 7/2015 | Takano | |
| 2015/0215962 A1 | 7/2015 | Mizusawa | |
| 2016/0080135 A1 | 3/2016 | Takano et al. | |
| 2016/0135157 A1 | 5/2016 | Takano | |

FOREIGN PATENT DOCUMENTS

| | | |
|---|---|---|
| WO | WO 2010/125769 A1 | 11/2010 |
| WO | WO 2012/084001 A1 | 6/2012 |

OTHER PUBLICATIONS

No Author Listed, Discussion on Enhancements for Dynamic TDD UL-DL Configuration, 3GPP TSG-RAN WG1 Meeting #69, R1-122363, $3^{rd}$ Generation Partnership Project, Renesas Mobile Europe Ltd, Prague, Czech Republic, May 21-25, 2012, retrieved May 12, 2012, 4 pages.

No Author Listed, Evolved Universal Terrestrial Radio Access (E-UTRA); Physical channels and modulation (Release 10), $3^{rd}$ Generation Partnership Project, Technical Specification Group Radio Access Network, 3GPP TS 36.211 V10.0.0 (Dec. 2010), 103 pages.

No Author Listed, Dynamic Reconfiguration of TDD UL-DL Configuration, 3GPP TSG RAN WG1 Meeting #69, R1-122267, $3^{rd}$ Generation Partnership Project, Samsung, Prague, Czech Republic, May 21-25, 2012, retrieved May 12, 2012, 2 pages.

No Author Listed, Semi-static reconfiguration of TDD UL-DL configuration, $3^{rd}$ Generation Partnership Project, TSG RAN WG1 Meeting #69, R1-122266, Samsung, Prague, Czech Republic, May 21-25, 2012, 2 pages.

No Author Listed, TDD DL-UL Reconfiguration Methods for eIMTA, 3GPP TSG RAN WG1 Meeting #69, R1-122318, $3^{rd}$ Generation Partnership Project, LG Electronics, Prague, Czech Republic, May 21-25, 2012, retrieved May 12, 2012, 5 pages.

No Author Listed, Methods to support different time scales for TDD UL-DL reconfiguration. $3^{rd}$ Generation Partnership Project Text Proposal for TR36.828 section 7. May 21-25, 2012. 3 pages.

U.S. Appl. No. 12/883,870, filed Sep. 16, 2010, Takahashi.
U.S. Appl. No. 12/890,768, filed Sep. 27, 2010, Watanabe.
U.S. Appl. No. 12/909,637, filed Oct. 21, 2010, Tanaka et al.
U.S. Appl. No. 14/346,412, filed May 28, 2014, Takano.
U.S. Appl. No. 14/397,906, filed Oct. 30, 2014, Takano et al.
U.S. Appl. No. 14/402,854, filed Nov. 21, 2014, Takano.
U.S. Appl. No. 14/402,896, filed Nov. 21, 2014, Takano.
U.S. Appl. No. 14/406,364, filed Dec. 8, 2014, Takano.
U.S. Appl. No. 14/409,577, filed Dec. 19, 2014, Takano.
U.S. Appl. No. 14/946,694, filed Nov. 19, 2015, Takano et al.
U.S. Appl. No. 15/002,234, filed Jan. 20, 2016, Takano.
U.S. Appl. No. 13/053,554, filed Mar. 22, 2011, Mizusawa.
U.S. Appl. No. 13/550,857, filed Jul. 17, 2012, Mizusawa et al.
U.S. Appl. No. 14/358,279, filed May 15, 2014, Mizusawa.
U.S. Appl. No. 14/418,949, filed Feb. 1, 2015, Mizusawa.
U.S. Appl. No. 15/270,049, filed Sep. 20, 2016, Takano et al.
U.S. Appl. No. 15/332,397, filed Oct. 24, 2016, Takano.

* cited by examiner

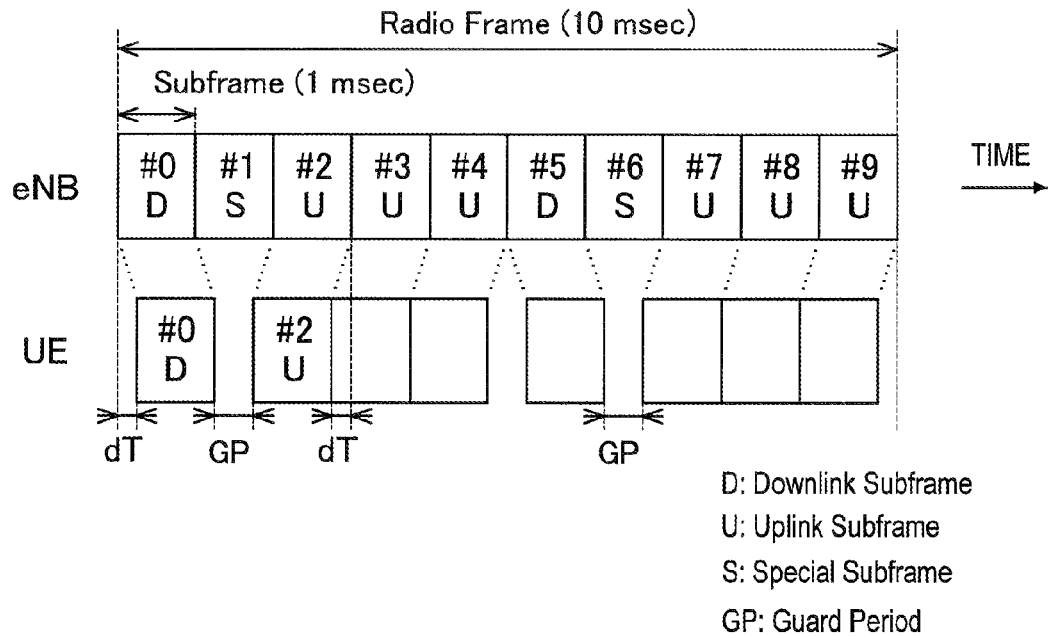

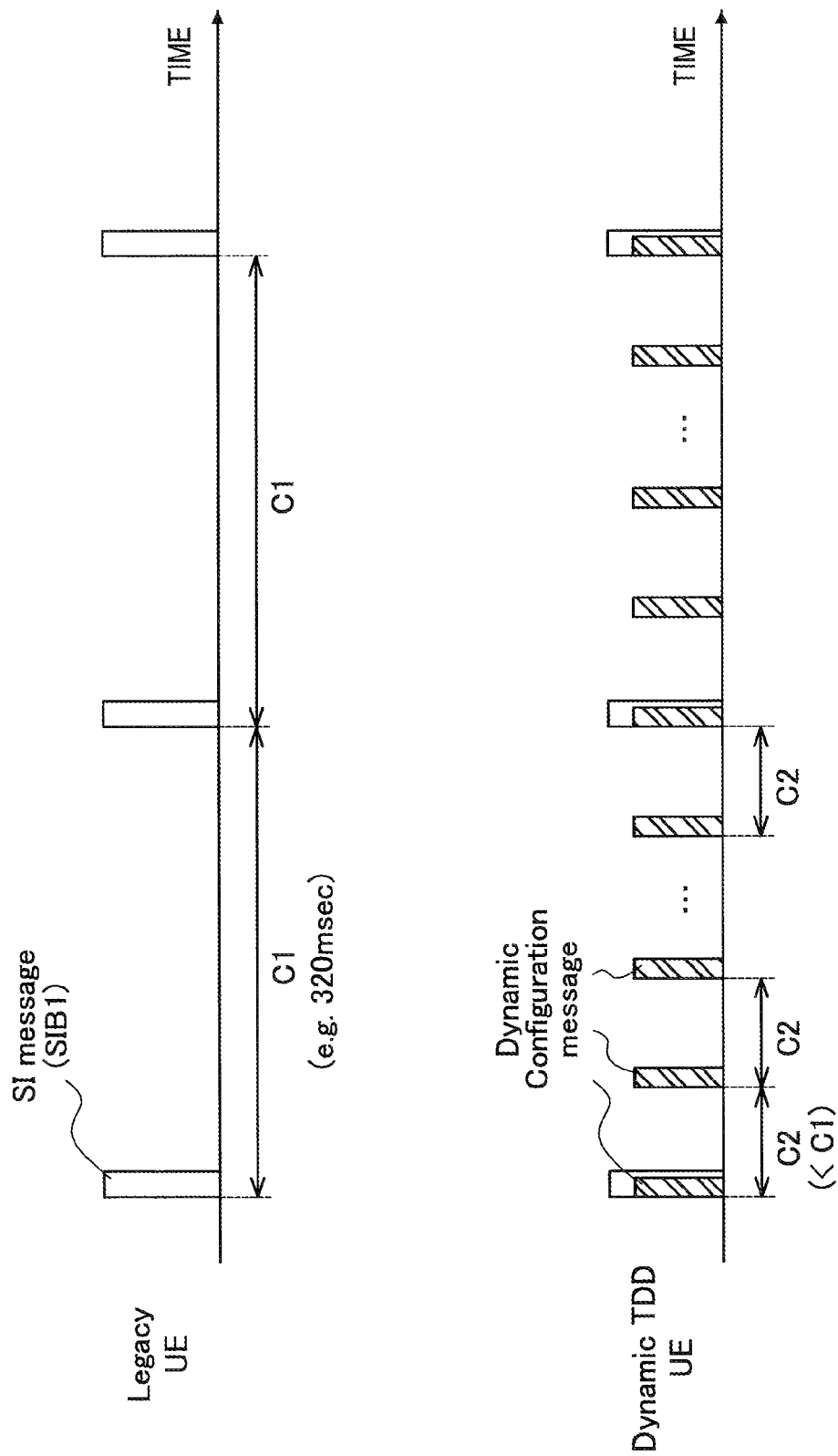

FIG.7

|  | \ | 0 | 1 | 2 | 3 | 4 | 5 | 6 |
|---|---|---|---|---|---|---|---|---|
| Dynamic TDD Configuration | 0 |   |   |   |   |   |   |   |
|  | 1 | N |   |   | N |   |   | N |
|  | 2 | N | N |   | N | N |   | N |
|  | 3 | N | N | N |   |   |   | N |
|  | 4 | N | N | N | N |   |   | N |
|  | 5 | N | N | N | N | N |   | N |
|  | 6 | N |   |   |   |   |   |   |

Legacy Configuration

N : NOT SELECTABLE

FIG.10

| | | Legacy UE Configuration | | | | | | |
|---|---|---|---|---|---|---|---|---|
| | | 0 | 1 | 2 | 3 | 4 | 5 | 6 |
| Dynamic TDD UE Configuration | 0 | | | | | | | |
| | 1 | N | | | N | | N | N |
| | 2 | N | | | N | N | | N |
| | 3 | N | N | N | | | | N |
| | 4 | N | N | N | | | | N |
| | 5 | N | N | N | N | N | | N |
| | 6 | N | | | | | | |

N : NOT SELECTABLE

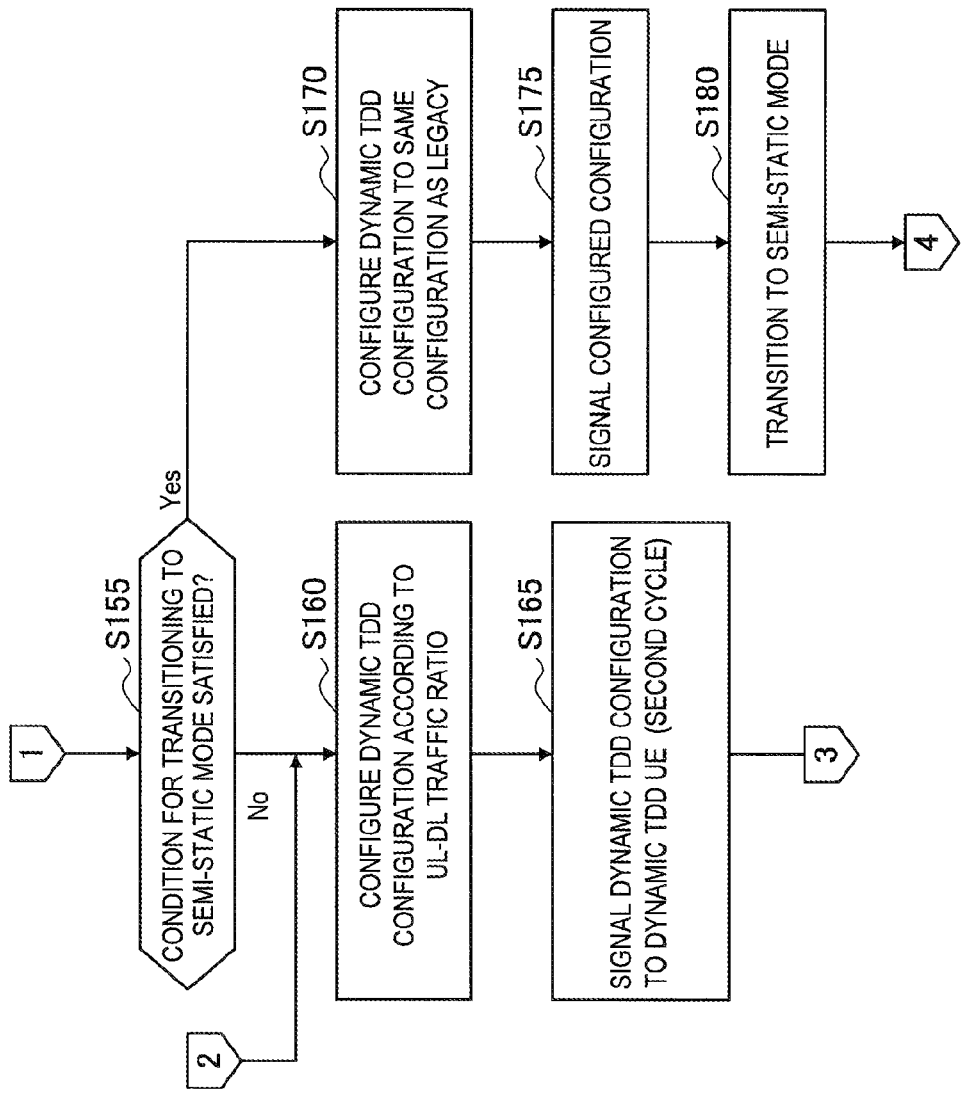

COMMUNICATION CONTROL DEVICE, COMMUNICATION CONTROL METHOD, PROGRAM, TERMINAL DEVICE, AND COMMUNICATION CONTROL SYSTEM

TECHNICAL FIELD

The present disclosure relates to a communication control device, a communication control method, a program, a terminal device, and a communication control system.

BACKGROUND ART

Recently, a high-speed cellular radio communication scheme called Long Term Evolution (LTE) is being practically implemented. The LTE scheme is categorized into the FD-LTE scheme and the TD-LTE scheme, on the basis of differences in the duplex scheme. The FD-LTE scheme adopts frequency-division duplex (FDD) as the duplexing scheme, with the uplink and the downlink being operated on mutually different frequency bands. The TD-LTE scheme adopts time-division duplex (TDD) as the duplexing scheme, with the uplink and the downlink being operated on the same frequency band. Both the FD-LTE scheme and the TD-LTE scheme use a frame format in which one radio frame (having a duration of 10 ms) is made up of 10 subframes each having a duration of 1 ms. In the FD-LTE scheme, the link direction does not change over time on the same frequency band, whereas in the TD-LTE scheme, the link direction may change per subframe.

In the TD-LTE scheme, a set of link directions per subframe for each radio frame (that is, a combination of the link directions of 10 subframes) is designated the link direction configuration (or the UL-DL configuration). According to Non-Patent Literature 1 below, seven types of link direction configurations from Configuration 0 to Configuration 6 are defined. A radio base station (designated eNB in the LTE scheme) signals to a terminal device (designated UE in the LTE scheme) by broadcasting the link direction configuration configured for each radio frame in a system information block type 1 (SIB1). In the current standard specification, the update cycle of the link direction configuration conducted using the SIB1 is 640 ms. Non-Patent Literature 2 below proposes shortening this cycle to 320 ms.

CITATION LIST

Non-Patent Literature

Non-Patent Literature 1: "3GPP TS 36.211 V10.0.0 (2010-12)", Dec. 22, 2010
Non-Patent Literature 2: "Semi-static reconfiguration of TDD UL-DL configuration", R1-122266, 3GPP TSG RAN WG1 Meeting #69, Prague, Czech Republic, May 21-25, 2012

SUMMARY OF INVENTION

Technical Problem

However, a 640 ms or 320 ms signaling cycle may not be sufficient in modern radio communication environments, in which the variation of the ratio between uplink traffic and downlink traffic (the UL-DL traffic ratio) is becoming more intense. If the link direction configuration updates do not keep up with the variations in the UL-DL traffic ratio, the amount of buffered traffic will increase, and the problems of decreased resource utilization and lowered throughput may occur.

Consequently, it is desirable to provide a mechanism that enables the link direction configuration of a terminal device to more rapidly track variations in the UL-DL traffic ratio.

Solution to Problem

According to the present disclosure, there is provided a communication control device that controls radio communication conducted by one or more terminal devices according to a time-division duplex (TDD) scheme, the communication control device including a configuration section that configures, for each frame that includes a plurality of subframes, a link direction configuration expressing a link direction per subframe, and a control section that signals the link direction configuration configured by the configuration section to each terminal device. The configuration section configures a first link direction configuration for a first terminal group, and configures a second link direction configuration for a second terminal group, and the control section signals the first link direction configuration to a terminal device belonging to the first terminal group on a first cycle, and signals the second link direction configuration to a terminal device belonging to the second terminal group on a second cycle that is shorter than the first cycle.

Further, according to the present disclosure, there is provided a communication control method for controlling radio communication conducted by one or more terminal devices according to a time-division duplex (TDD) scheme in a communication control device, the communication control method including configuring, for each frame that includes a plurality of subframes, a first link direction configuration and a second link direction configuration expressing a link direction per subframe, signaling the first link direction configuration to a terminal device belonging to a first terminal group on a first cycle, and signaling the second link direction configuration to a terminal device belonging to a second terminal group on a second cycle that is shorter than the first cycle.

Further, according to the present disclosure, there is provided a program for causing a computer of a communication control device that controls radio communication conducted by one or more terminal devices according to a time-division duplex (TDD) scheme to function as a configuration section that configures, for each frame that includes a plurality of subframes, a link direction configuration expressing a link direction per subframe, and a control section that signals the link direction configuration configured by the configuration section to each terminal device. The configuration section configures a first link direction configuration for a first terminal group, and configures a second link direction configuration for a second terminal group, and the control section signals the first link direction configuration to a terminal device belonging to the first terminal group on a first cycle, and signals the second link direction configuration to a terminal device belonging to the second terminal group on a second cycle that is shorter than the first cycle.

Further, according to the present disclosure, there is provided a terminal device including a radio communication section that communicates with a base station according to a time-division duplex (TDD) scheme, and a control section that, according to a link direction configuration signaled from the base station, configures a link direction per subframe for each frame that includes a plurality of subframes.

The control section causes the radio communication section to receive a signaling of a second link direction configuration configured for a second terminal group to which the terminal device belongs on a signaling cycle that is shorter than a signaling cycle of a first link direction configuration configured for a first terminal group.

Further, according to the present disclosure, there is provided a communication control system including one or more terminal devices that conduct radio communication according to a time-division duplex (TDD) scheme, and a communication control device that controls the radio communication conducted by the one or more terminal devices. The communication control device includes a configuration section that configures, for each frame that includes a plurality of subframes, a link direction configuration expressing a link direction per subframe, and a control section that signals the link direction configuration configured by the configuration section to each terminal device. The configuration section configures a first link direction configuration for a first terminal group, and configures a second link direction configuration for a second terminal group, and the control section signals the first link direction configuration to a terminal device belonging to the first terminal group on a first cycle, and signals the second link direction configuration to a terminal device belonging to the second terminal group on a second cycle that is shorter than the first cycle.

Advantageous Effects of Invention

According to technology in accordance with the present disclosure, the link direction configuration of a terminal device may more rapidly track variations in the UL-DL traffic ratio.

BRIEF DESCRIPTION OF DRAWINGS

FIG. 1 is an explanatory diagram for describing an example of a link direction configuration in TD-LTE.

FIG. 2 is an explanatory diagram illustrating a list of configurable link direction configurations in TD-LTE.

FIG. 4 is an explanatory diagram for describing signaling of a link direction configuration using a new message.

FIG. 7 is an explanatory diagram for explaining a combination of legacy and dynamic TDD configurations in the first technique.

FIG. 10 is an explanatory diagram for explaining a combination of legacy and dynamic TDD configurations in the second technique.

FIG. 23B is the first part of a flowchart illustrating an example of a flow of a communication control process executed according to the first technique.

DESCRIPTION OF EMBODIMENTS

Figure 3A:
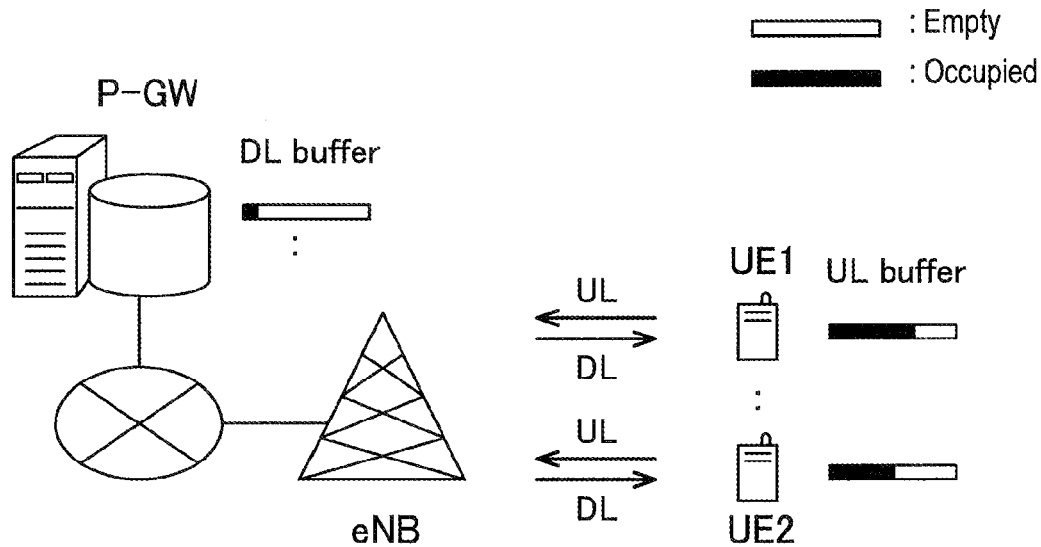
FIG. 3A is a first explanatory diagram for describing the configuration of a link direction configuration according to buffer status.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Also, the description will proceed in the following order.
1. Overview
1-1. Configuring link direction configuration
1-2. Signaling link direction configuration
1-3. Basic principles
2. Configuration of communication control system
2-1. Overview of system
2-2. Exemplary configuration of legacy terminal
2-3. Exemplary configuration of dynamic TDD terminal
2-4. Exemplary configuration of communication control device 2-5. Configuration mode transitions
3. Process flow examples
3-1. Terminal-side process
3-2. Network-side process
4. Conclusion <1. Overview>
[1-1. Configuring Link Direction Configuration]

FIG. 1 is an explanatory diagram for describing an example of a link direction configuration in TD-LTE. Referring to FIG. 1, a frame format of a radio frame adopted in the LTE scheme is illustrated. One radio frame includes 10 subframes (#0 to #9). The duration of each subframe is 1 ms, and the duration of one radio frame is 10 ms. The link direction is configured per subframe. In the example of FIG. 1, the link direction of subframes labeled "D" is downlink, and such subframes are designated downlink subframes. The link direction of subframes labeled "U" is uplink, and such subframes are designated uplink subframes. The subframes labeled "S" are special subframes unique to TD-LTE. As exemplified in FIG. 1, a downlink signal transmitted from a base station (eNB) arrives at a terminal device (UE) with a delay dT. The terminal device takes the delay dT of an uplink signal arriving at the base station into consideration, and transmits an uplink signal prior to the timing of an uplink subframe of the base station. A special subframe is inserted at the timing of switching from a downlink subframe to an uplink subframe, and acts as a buffer period so that the timings of receiving a downlink signal and transmitting an uplink signal at a terminal device do not overlap. A special subframe includes a downlink pilot time slot in which a downlink signal is received by the UE, a guard period, and an uplink pilot time slot in which an uplink signal is transmitted by the UE. Note that downlink data may also be transmitted from the base station to the terminal device in the special subframe. In this sense, the special subframe may be viewed as being a type of downlink subframe.

FIG. 2 illustrates a list of seven types of configurable link direction configurations in TD-LTE, which are defined in Non-Patent Literature 1 above. As FIG. 2 demonstrates, the 0th subframe (#0) and the 5th subframe (#5) are configured as downlink subframes in all configurations. The 1st subframe (#1) is configured as a special subframe in all configurations. The 2nd subframe (#2) is configured as an uplink subframe in all configurations. Configuration of the remaining subframes differs for each configuration.

On the right edge of FIG. 2, the ratio of the number of uplink subframes versus the number of downlink subframes (UL-DL ratio) is indicated. In Configuration 0, there are six uplink subframes and two downlink subframes, for a UL-DL ratio of 6:2. In Configuration 1, there are four uplink subframes and four downlink subframes, for a UL-DL ratio of 4:4. In Configuration 2, there are two uplink subframes and six downlink subframes, for a UL-DL ratio of 2:6. In Configuration 3, there are three uplink subframes and six downlink subframes, for a UL-DL ratio of 3:6. In Configuration 4, there are two uplink subframes and seven downlink subframes, for a UL-DL ratio of 2:7. In Configuration 5, there is one uplink subframe and eight downlink subframes, for a UL-DL ratio of 1:8. In Configuration 6, there are five uplink subframes and three downlink subframes, for a UL-DL ratio of 5:3.

Figure 3B:
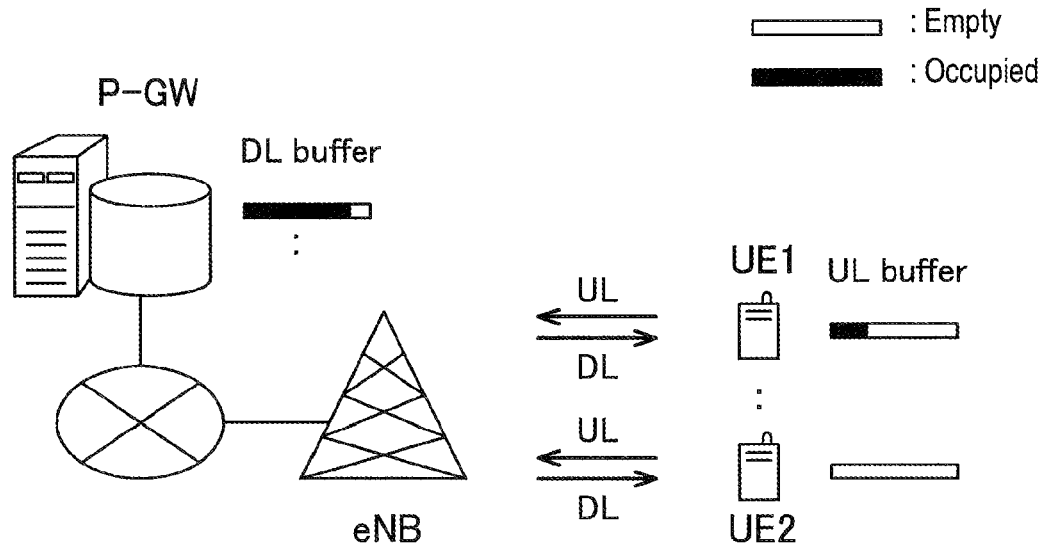
FIG. 3B is a second explanatory diagram for describing the configuration of a link direction configuration according to buffer status.

A radio communication system that operates according to the TD-LTE scheme may decide which of the seven types of link direction configurations to use on the basis of the UL-DL traffic ratio. Generally, an uplink signal is buffered by the terminal device's uplink buffer before transmission is granted. Meanwhile, a downlink signal is buffered by the PDN Gateway (P-GW) on the core network before transmission is scheduled. If the amount of buffered traffic exceeds the buffer capacity, a buffer overflow occurs. In addition, traffic that has been buffered past a designated period may be discarded as a timeout. Accordingly, the terminal device periodically transmits to the base station a buffer status report indicating the amount of uplink traffic being buffered. The P-GW provides buffer signaling that indicates the amount of downlink traffic being buffered. Consequently, a scheduler inside the base station or another control node is able to compute the UL-DL traffic ratio for each cell. For example, in the example of FIG. 3A, there is more buffered uplink traffic than buffered downlink traffic. In this case, by configuring a link direction configuration with a high uplink ratio, the buffered uplink traffic may be decreased. On the other hand, in the example of FIG. 3B, there is more buffered downlink traffic than buffered uplink traffic. In this case, by configuring a link direction configuration with a high downlink ratio, the buffered downlink traffic may be decreased.

[1-2. Signaling Link Direction Configuration]

A link direction configuration that has been configured by the base station or another control node is signaled with a broadcast using the SIB1 from the base station to the terminal device. The update cycle of the SIB1 in the current standard specification is 640 ms. According to the above Non-Patent Literature 2, the update cycle of the link direction configuration using the SIB1 may be shortened to 320 ms. The SIB1 is one of various types of system information blocks (SIBs) mapped to the downlink shared channel (DL-SCH). A message transporting an SIB is designated a system information (SI) message. The shortest transmission cycle of an SI message is 80 ms. Consequently, as long as the link direction configuration is signaled with an SI message, the shortest update cycle of the link direction configuration is 80 ms.

Recently, radio communication traffic has been dramatically increasing. The UL-DL traffic ratio varies frequently. Consequently, the signaling cycle of the link direction configuration in existing techniques is less than sufficient to track the variations in the UL-DL traffic ratio. If the link direction configuration updates do not keep up with the variations in the UL-DL traffic ratio, the amount of buffered traffic will increase, leading to decreased resource utilization and lowered throughput. Without taking signaling overhead into account, since the duration of one radio frame is 10 ms, the ideal update cycle of the link direction configuration is 10 ms. However, if the mechanism for signaling the link direction configuration is completely changed from existing techniques, existing terminal devices will be unable to acquire the link direction configuration and become inoperative. Consequently, in the technology according to the present disclosure, a new mechanism as described hereinafter is used to enable the link direction configuration to rapidly track variations in the UL-DL traffic ratio, while minimizing the impact on existing terminal devices.

[1-3. Basic Principles]
(1) New Signaling Message

Accordingly to an embodiment of the present disclosure, there is introduced a new message different from a SI message for signaling the link direction configuration to a terminal device on a shorter cycle than existing techniques. In this specification, this new message to be introduced is designated the dynamic configuration message. In addition, a terminal device that receives only an SI message in order to configure the link direction configuration is designated a legacy terminal (legacy UE). In contrast, a terminal device that receives a dynamic configuration message is designated a dynamic TDD terminal (dynamic TDD UE).

FIG. 4 is an explanatory diagram for describing signaling of a link direction configuration using a dynamic configuration message.

The top part of FIG. 4 illustrates how a legacy terminal periodically receives an SI message transporting the SIB1 on a cycle C1. The SIB1 includes a link direction configuration identity (one of the configuration numbers 0 to 6 exemplified in FIG. 2) configured for the legacy terminal at that time. Following this link direction configuration, the legacy terminal configures the link direction of its own radio communication circuit per subframe. The SI message signaling cycle C1 is 320 ms, for example. At this point, suppose that the UL-DL traffic ratio varies greatly at a time 20 ms after receiving the SI message. In this case, a mismatch between the configured link direction configuration and the UL-DL traffic ratio would continue over a period of 300 ms until the next SI message is received.

The bottom part of FIG. 4 illustrates how a dynamic TDD terminal periodically receives a dynamic configuration message on a cycle C2 (where C2<C1). The dynamic configuration message includes a link direction configuration identity (one of the configuration numbers 0 to 6 exemplified in FIG. 2) configured for the dynamic TDD terminal at that time. Following this link direction configuration, the dynamic TDD terminal configures the link direction of its own radio communication circuit per subframe. The dynamic configuration message signaling cycle C2 may be an integer multiple of 10 ms. For example, if the signaling cycle C2=40 ms, the period of a continued mismatch between the link direction configuration and the UL-DL traffic ratio would be at worst 40 ms.

As FIG. 4 demonstrates, according to an embodiment of the present disclosure, the base station signals to a legacy terminal a first link direction configuration using an SI message, and signals to a dynamic TDD terminal a second link direction configuration using a dynamic configuration message. In this specification, the first link direction configuration that may be updated on the cycle C1 is designated the legacy configuration. Also, the second link direction configuration that may be updated on the cycle C2 is designated the dynamic TDD configuration. The base station signals these two configurations, but in actual practice operates according to the dynamic TDD configuration as described later.

As a result of the dynamic TDD configuration being updated on a shorter cycle than the legacy configuration, differences in link direction occur between these two configurations. Differences in link direction between two link configurations may possibly affect the synchronization operation of the legacy terminal, as well as the timing of ACK/NACK and uplink grants involving the legacy terminal.

(2) Effects on Synchronization Operation of Legacy Terminal

Figure 5A:
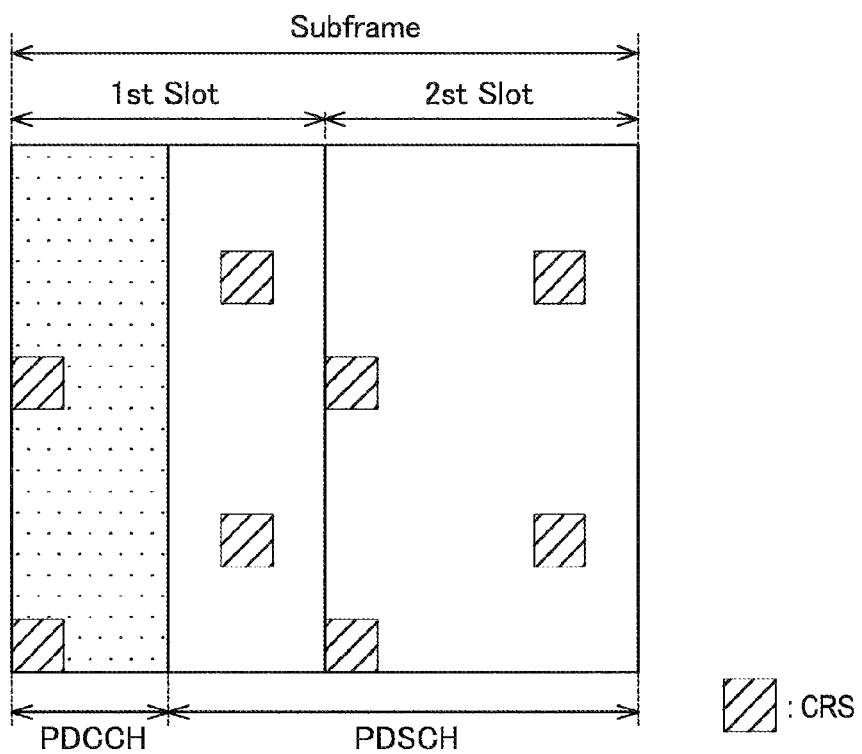
FIG. 5A is an explanatory diagram illustrating a first example of a subframe that includes a cell-specific reference symbol (CRS).
Figure 5B:
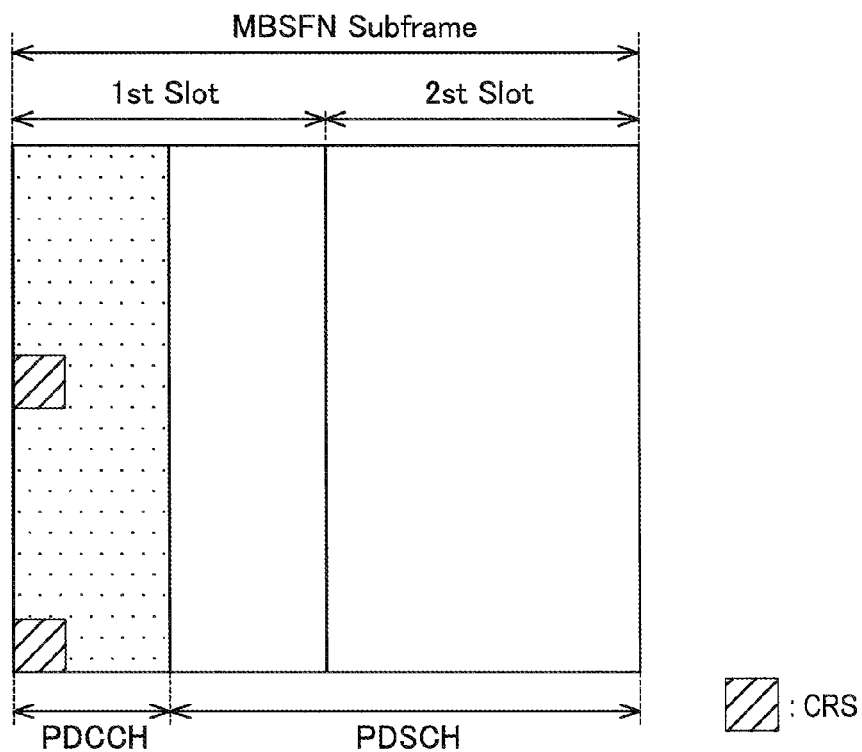
FIG. 5B is an explanatory diagram illustrating a second example of a subframe that includes a CRS.

Generally the synchronization operation of a terminal device includes initial synchronization and synchronization tracking. Initial synchronization refers to synchronization from a state in which the operating timings of the terminal device are completely unsynchronized with the operating timings of the base station. Initial synchronization is conducted by having the terminal device search for a primary synchronization signal (PSS) and a secondary synchronization signal (SSS). Via initial synchronization, the terminal device acquires the cell ID of the connecting cell, and ascertains the rough timings of radio frames. Synchronization tracking is executed after the completion of initial synchronization in order to improve the synchronization precision. Synchronization tracking is conducted by having the terminal device receive a cell-specific reference symbol (CRS). As exemplified in FIG. 5A, as a general rule the CRS is dispersively inserted into the physical downlink control channel (PDCCH) and the physical downlink shared channel (PDSCH) of each downlink subframe. The terminal device maintains the synchronization of operating timings by receiving the CRS in these downlink subframes in both idle mode (RRC_Idle) and active mode (RRC_Connected), irrespective of whether or not data addressed to the device itself exists. Note that if a downlink subframe is configured as an MBMS single frequency network (MBSFN) subframe, the PDSCH of that downlink subframe is used only for the purpose of broadcasting or multicasting a Multimedia Broadcast Multicast Services (MBMS) signal. As exemplified in FIG. 7B, the CRS is not inserted into the PDSCH of an MBSFN subframe.

At this point, assume that Configuration 2 is configured as the legacy configuration, and Configuration 4 is configured as the dynamic TDD configuration, for example (see FIG. 2). Since the base station operates in accordance with the dynamic TDD configuration, the link direction of the 3rd subframe (#3) is uplink, and the link direction of the 7th subframe (#7) is downlink. However, a legacy terminal, following the legacy configuration, recognizes that the link direction of the 3rd subframe is downlink, and the link direction of the 7th subframe is uplink. Subsequently, the legacy terminal attempts to receive the CRS for synchronization tracking in the 3rd subframe. However, the base station does not transmit the CRS in that subframe, which is actually an uplink subframe. As a result, there occurs a risk of lowered synchronization tracking precision in the legacy terminal. Note that in the 7th subframe, although the base station transmits the CRS, the legacy terminal does not receive that CRS. However, the synchronization tracking precision of the legacy terminal does not drop even if some of the CRS symbols are not received, and thus the effects of link direction differences in the 7th subframe are small.

The effects on the synchronization operation of the legacy terminal discussed above that may occur as a result of introducing a new dynamic configuration message may be solved by the first technique or the second technique described hereinafter.

(2-a) First Technique

In the first technique, a configuration with a higher uplink ratio is configured as the legacy configuration. Additionally, a configuration derived by substituting uplink subframes in the legacy configuration with downlink subframes is configured as the dynamic TDD configuration. Special subframes may also be substituted with downlink subframes.

Figure 6:
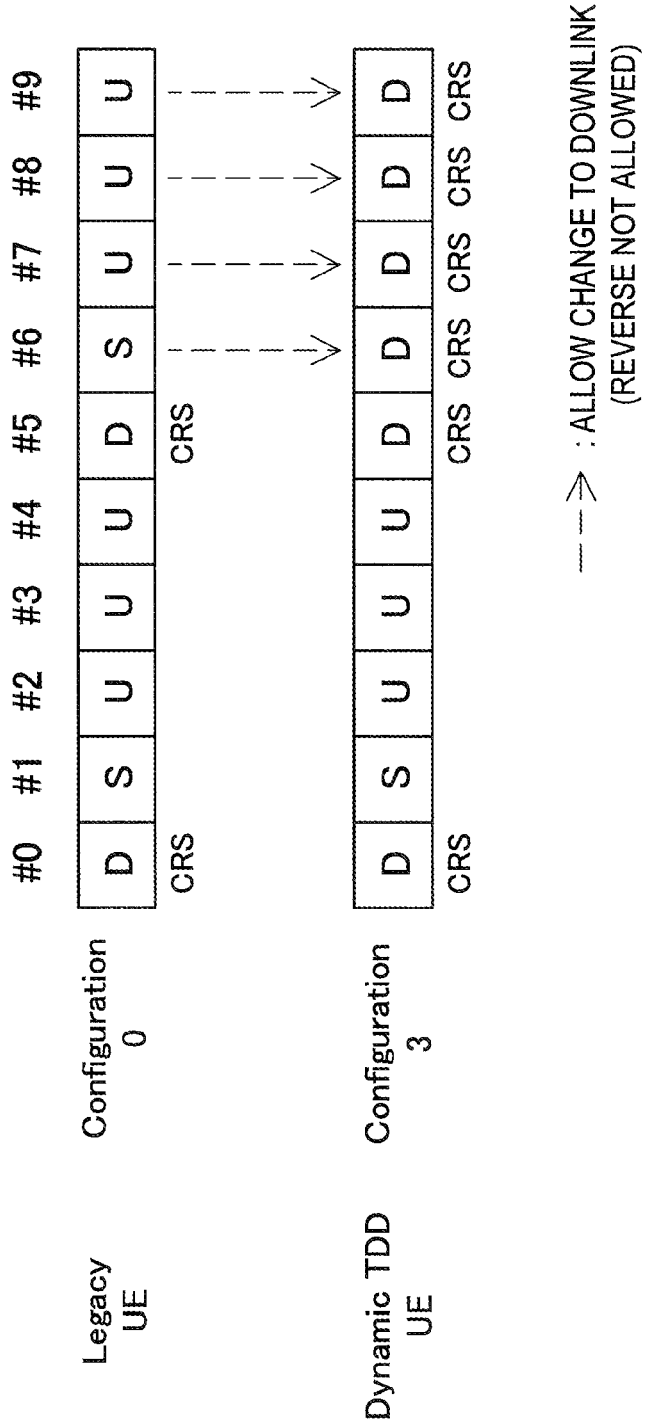
FIG. 6 is an explanatory diagram for explaining a first technique for solving the effects of link direction differences.

FIG. 6 is an explanatory diagram for explaining the first technique for solving the effects of link direction differences. The top part of FIG. 6 indicates Configuration 0, which may be configured as the legacy configuration. The 0th and 5th subframes of Configuration 0 are downlink subframes, while the 1st and 6th subframes are special subframes, and the 2nd to 4th and 7th to 9th subframes are uplink subframes. The CRS is transmitted from the base station in the 0th and 5th subframes. The dynamic TDD configuration may also be Configuration 0. However, if the UL-DL ratio of Configuration 0 does not fit the UL-DL traffic ratio, the dynamic TDD configuration is updated to any link configuration derived by substituting one or more uplink subframes (and special subframes) in Configuration 0 with downlink subframes. In the example in the bottom part of FIG. 6, the dynamic TDD configuration is configured to Configuration 3. In Configuration 3, the 6th subframe (special subframe) and the 7th to 9th subframes (uplink subframes) of Configuration 0 are substituted with downlink subframes.

In the example of FIG. 6, in the 0th and 5th subframes in which the legacy terminal receives the CRS, the CRS is actually transmitted from the base station according to Configuration 3. Consequently, the legacy terminal is able to executing synchronization tracking normally by receiving these CRS.

On the other hand, in the example of FIG. 6, if the legacy terminal transmits an uplink signal in the 7th subframe, for example, since the 7th subframe is actually a downlink subframe, the transmitted uplink signal is not received by the base station. Rather, that uplink signal may possibly exert harmful interference on a downlink signal (received by another terminal device). Consequently, in the first technique, the scheduler does not grant uplink transmission to the legacy terminal for subframes that have been substituted with downlink subframes in the dynamic TDD configuration. As a result, the transmission of wasted uplink signals by the legacy terminal may be avoided, and interference may be prevented.

The matrix in FIG. 7 illustrates selectable combinations of a legacy configuration and a dynamic TDD configuration in the first technique. The horizontal axis of the matrix corresponds to the legacy configuration, while the vertical axis corresponds to the dynamic TDD configuration. In the diagram, combinations labeled "N" are combinations that are not selected in the first technique. For example, if the legacy configuration is Configuration 0, all seven types of link direction configurations are selectable as the dynamic TDD configuration. If the legacy configuration is Configuration 1, Configuration 1, 2, 4, and 5 are selectable as the dynamic TDD configuration. If the legacy configuration is Configuration 2, Configuration 2 and 5 are selectable as the dynamic TDD configuration. If the legacy configuration is Configuration 3, Configuration 3, 4, and 5 are selectable as the dynamic TDD configuration. If the legacy configuration is Configuration 4, Configuration 4 and 5 are selectable as the dynamic TDD configuration. If the legacy configuration is Configuration 5, only Configuration 5 is selectable as the dynamic TDD configuration. If the legacy configuration is Configuration 6, Configuration 1, 2, 3, 4, 5, and 6 are selectable as the dynamic TDD configuration. The combinations labeled "N" in the diagram are all combinations containing a subframe that is a downlink subframe in the legacy configuration, but an uplink subframe in the dynamic TDD configuration. By forbidding the selection of such combinations, it is possible to prevent a legacy terminal from mistakenly receiving a signal that is not the CRS when attempting to receive the CRS.

Figure 8:
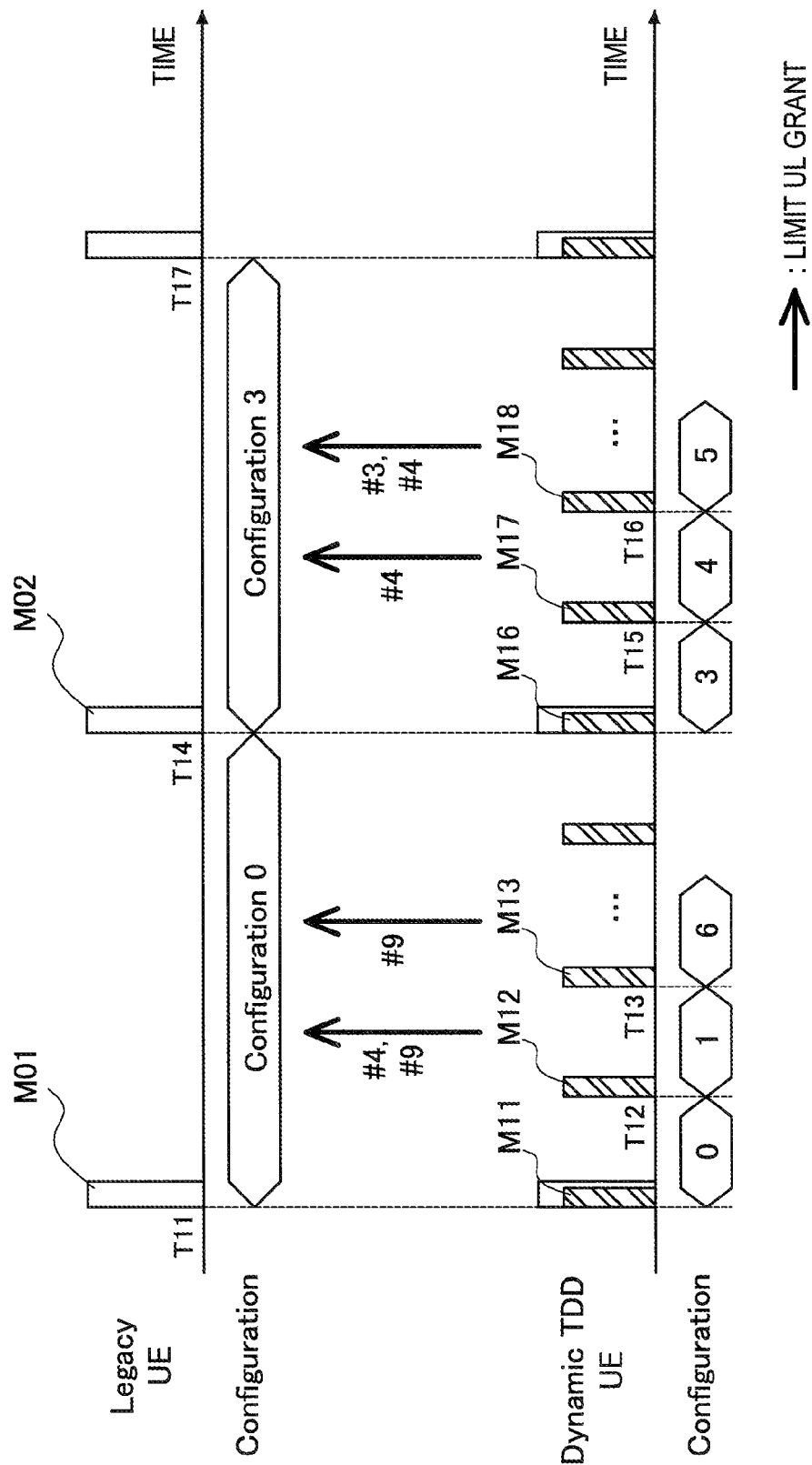
FIG. 8 is an explanatory diagram for explaining an example of link direction configurations configured in the first technique along a time axis.

FIG. 8 is an explanatory diagram for explaining an example of link direction configurations configured in the first technique along a time axis.

At time T11, the legacy terminal receives an SI message M01, and configures its own radio communication circuit to Configuration 0 specified in the SI message M01. The link direction configuration of the legacy terminal configured at this point is maintained until time T14, when the next SI message M02 is received. Meanwhile, at time T11, the dynamic TDD terminal receives a dynamic configuration message M11, and configures its own radio communication circuit to Configuration 0 specified in the message M11. After that, at time T12, the dynamic TDD terminal receives a dynamic configuration message M12, and configures its own radio communication circuit to Configuration 1 specified in the message M12. The link direction configuration of the dynamic TDD terminal configured at this point is maintained until time T13, when the next dynamic configuration message M13 is received. In Configuration 1, the 4th and 9th uplink subframes of Configuration 0 are substituted with downlink subframes. Consequently, during the period from time T12 to time T13, uplink transmission is not granted to the legacy terminal in the 4th and 9th subframes. At time T13, the dynamic TDD terminal receives a dynamic configuration message M13, and configures its own radio communication circuit to Configuration 6 specified in the message M13. The link direction configuration of the dynamic TDD terminal configured at this point is maintained until the time when the next dynamic configuration message is received. In Configuration 6, the 9th uplink subframe of Configuration 0 is substituted with a downlink subframe. Consequently, during the period in which Configuration 6 is configured as the dynamic TDD configuration, uplink transmission is not granted to the legacy terminal in the 9th subframe.

Subsequently, at time T14, the legacy terminal receives an SI message M02, and configures its own radio communication circuit to Configuration 3 specified in the SI message M02. The link direction configuration of the legacy terminal configured at this point is maintained until time T17, when the next SI message is received. Meanwhile, at time T14, the dynamic TDD terminal receives a dynamic configuration message M16, and configures its own radio communication circuit to Configuration 3 specified in the message M16. After that, at time T15, the dynamic TDD terminal receives a dynamic configuration message M17, and configures its own radio communication circuit to Configuration 4 specified in the message M17. The link direction configuration of the dynamic TDD terminal configured at this point is maintained until time T16, when the next dynamic configuration message M18 is received. In Configuration 4, the 4th uplink subframe of Configuration 3 is substituted with a downlink subframe. Consequently, during the period from time T15 to time T16, uplink transmission is not granted to the legacy terminal in the 4th subframe. At time T16, the dynamic TDD terminal receives a dynamic configuration message M18, and configures its own radio communication circuit to Configuration 5 specified in the message M18. The link direction configuration of the dynamic TDD terminal configured at this point is maintained until the time when the next dynamic configuration message is received. In Configuration 5, the 3rd and 4th uplink subframes of Configuration 3 are substituted with downlink subframes. Consequently, during the period in which Configuration 5 is configured as the dynamic TDD configuration, uplink transmission is not granted to the legacy terminal in the 3th and 4th subframes.

(2-b) Second Technique

In the second technique, a configuration with a higher downlink ratio is configured as the legacy configuration. In addition, at least one downlink subframe in the legacy configuration is configured as an MBSFN subframe. Additionally, a configuration derived by substituting downlink subframes configured as MBSFN subframes in the legacy configuration with uplink subframes is configured as the dynamic TDD configuration. Some of the MBSFN subframes may also be substituted with special subframes.

Figure 9:
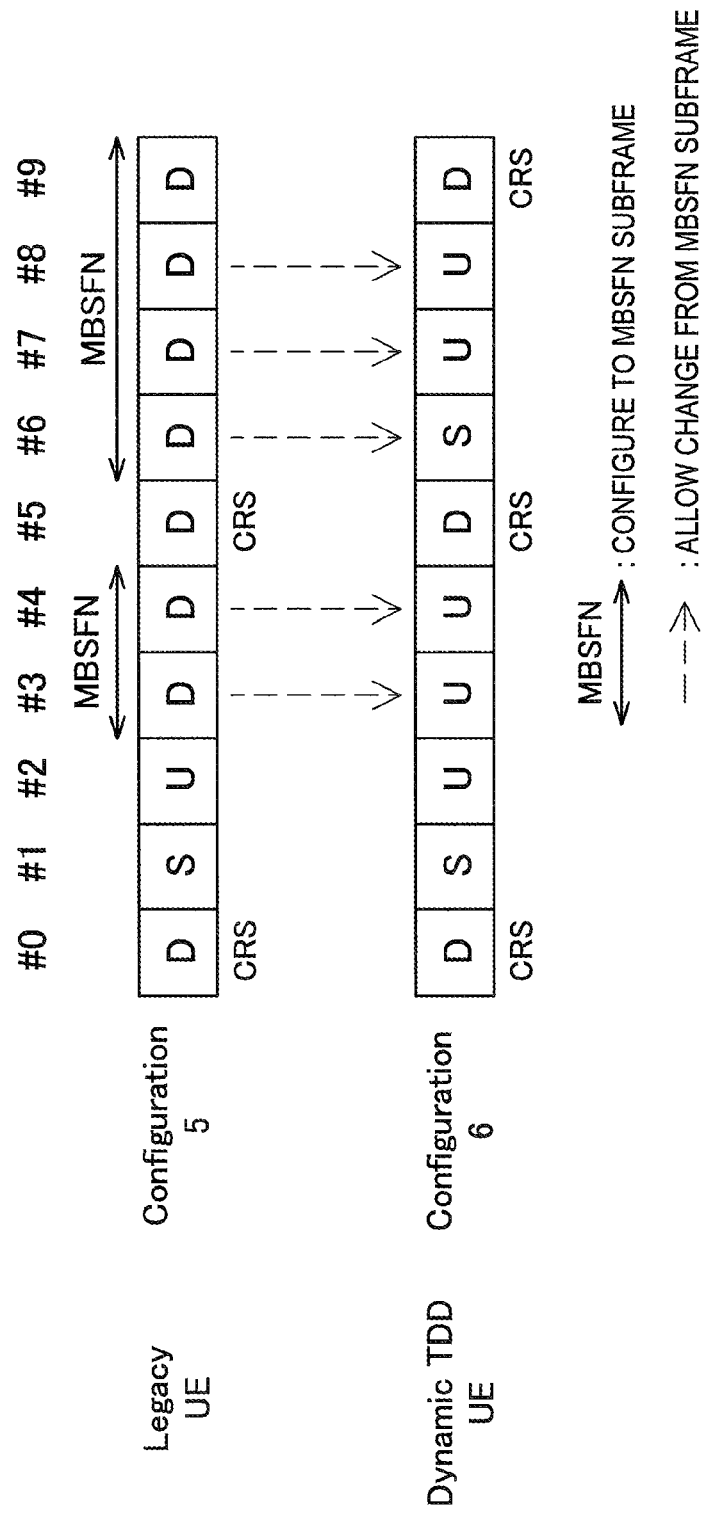
FIG. 9 is an explanatory diagram for explaining a second technique for solving the effects of link direction differences.

FIG. 9 is an explanatory diagram for explaining the second technique for solving the effects of link direction differences. The upper part of FIG. 9 indicates Configuration 5, which may be configured as the legacy configuration. The 0th and 3rd to 9th subframes of Configuration 5 are downlink subframes, while the 1st subframe is a special subframe, and the 2nd subframe is an uplink subframe. However, as an example, the 3rd, 4th, and 6th to 9th downlink subframes are configured as MBSFN subframes. The CRS is transmitted from the base station in the 0th and 5th subframes. The dynamic TDD configuration may also be Configuration 5. However, if the UL-DL ratio of Configuration 5 does not fit the UL-DL traffic ratio, the dynamic TDD configuration is updated to any link configuration derived by substituting one or more MBSFN subframes (and special subframes) in Configuration 5 with uplink subframes. In the example in the bottom part of FIG. 9, the dynamic TDD configuration is configured to Configuration 6. In Configuration 6, the 3rd, 4th, 7th, and 8th subframes (MBSFN subframes) of Configuration 5 are substituted with uplink subframes. The 6th subframe (MBSFN subframe) of Configuration 5 is substituted with a special subframe.

In the example of FIG. 9, in the 0th and 5th subframes in which the legacy terminal receives the CRS, the CRS is actually transmitted from the base station according to Configuration 6. Consequently, the legacy terminal is able to executing synchronization tracking normally by receiving these CRS.

The matrix in FIG. 10 illustrates selectable combinations of a legacy configuration and a dynamic TDD configuration in the second technique. The horizontal axis of the matrix corresponds to the legacy configuration, while the vertical axis corresponds to the dynamic TDD configuration. In the diagram, combinations labeled "N" are combinations that are not selected in the second technique. For example, if the legacy configuration is Configuration 0, only Configuration 0 is selectable as the dynamic TDD configuration. If the legacy configuration is Configuration 1, Configuration 0, 1, and 6 are selectable as the dynamic TDD configuration. If the legacy configuration is Configuration 2, Configuration 0, 1, 2, and 6 are selectable as the dynamic TDD configuration. If the legacy configuration is Configuration 3, Configuration 0, 3, and 6 are selectable as the dynamic TDD configuration. If the legacy configuration is Configuration 4, Configuration 0, 1, 3, 4, and 6 are selectable as the dynamic TDD configuration. If the legacy configuration is Configuration 5, all seven types of link direction configurations are selectable as the dynamic TDD configuration. If the legacy configuration is Configuration 6, Configuration 0 and 6 are selectable as the dynamic TDD configuration.

Figure 11:
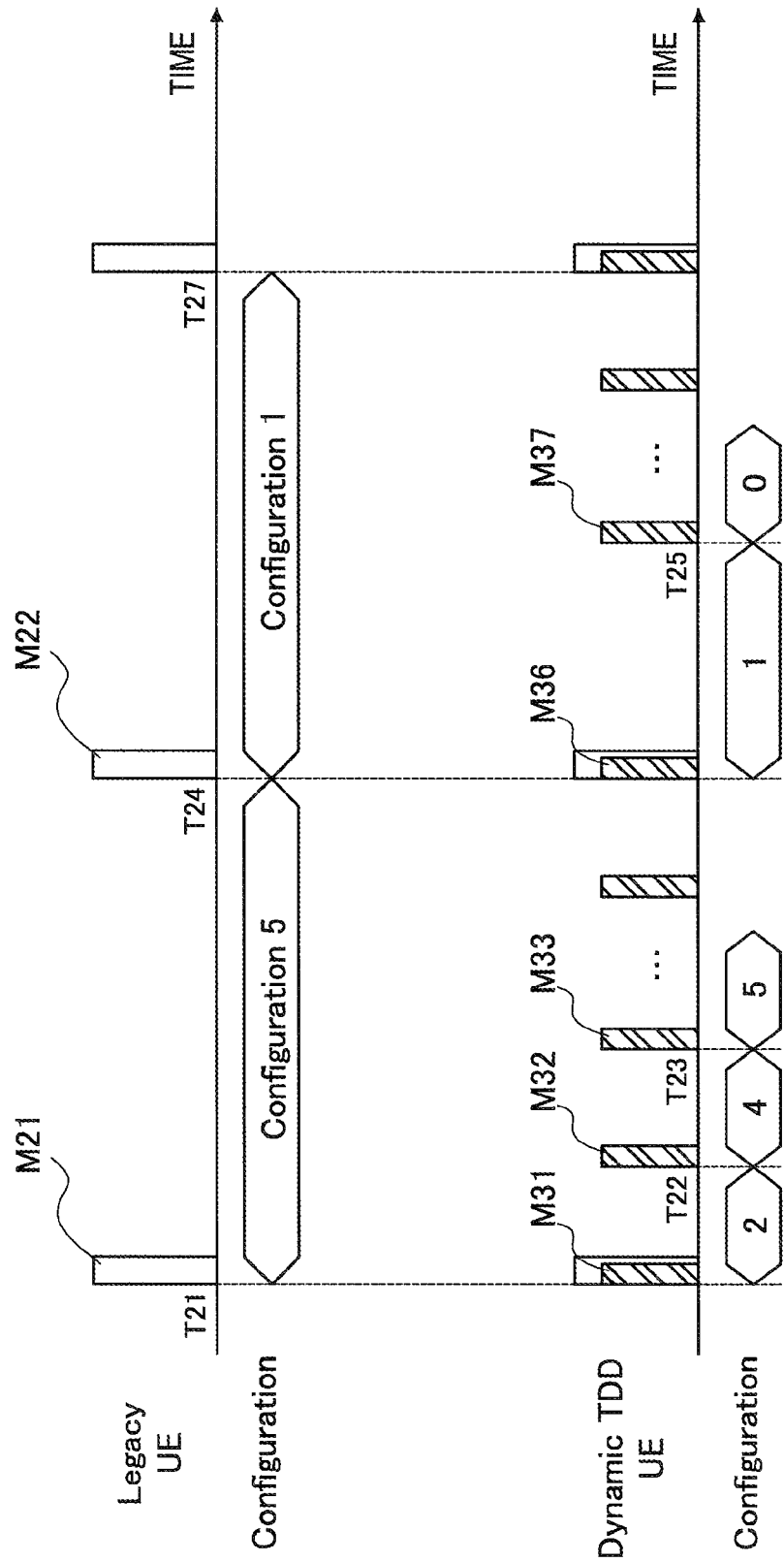
FIG. 11 is an explanatory diagram for explaining an example of link direction configurations configured in the second technique along a time axis.

FIG. 11 is an explanatory diagram for explaining an example of link direction configurations configured in the second technique along a time axis.

At time T21, the legacy terminal receives an SI message M21, and configures its own radio communication circuit to Configuration 5 specified in the SI message M21. The link direction configuration of the legacy terminal configured at this point is maintained until time T24, when the next SI message M22 is received. Meanwhile, at time T21, the dynamic TDD terminal receives a dynamic configuration message M31, and configures its own radio communication circuit to Configuration 2 specified in the message M31. After that, at time T22, the dynamic TDD terminal receives a dynamic configuration message M32, and configures its own radio communication circuit to Configuration 4 specified in the message M32. The link direction configuration of the dynamic TDD terminal configured at this point is maintained until time T23, when the next dynamic configuration message M33 is received. At time T23, the dynamic TDD terminal receives a dynamic configuration message M33, and configures its own radio communication circuit to Configuration 5 specified in the message M33. The link direction configuration of the dynamic TDD terminal configured at this point is maintained until the time when the next dynamic configuration message is received.

Subsequently, at time T24, the legacy terminal receives an SI message M22, and configures its own radio communication circuit to Configuration 1 specified in the SI message M22. The link direction configuration of the legacy terminal configured at this point is maintained until time T27, when the next SI message is received. Meanwhile, at time T24, the dynamic TDD terminal receives a dynamic configuration message M36, and configures its own radio communication circuit to Configuration 1 specified in the message M36. After that, at time T25, the dynamic TDD terminal receives a dynamic configuration message M37, and configures its own radio communication circuit to Configuration 0 specified in the message M37. The link direction configuration of the dynamic TDD terminal configured at this point is maintained until the time when the next dynamic configuration message is received.

According to the first technique or the second technique discussed above, a harmful effect on the synchronization operation of the legacy terminal caused by the introduction of dynamic configuration messages may be avoided. In addition, since the dynamic configuration messages may be transmitted on a shorter cycle than the SI messages, the configuration of the link direction configuration of the dynamic TDD terminal may be made to more rapidly track variations in the UL-DL traffic ratio.

Figure 12:
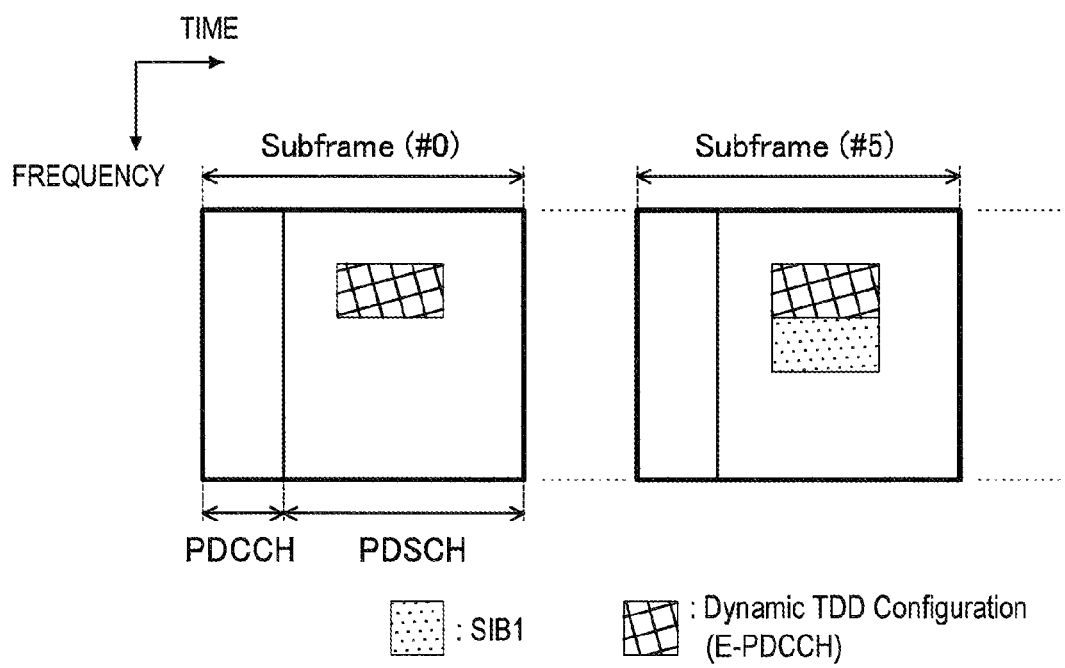
FIG. 12 is an explanatory diagram for explaining an example of a control information region in which a dynamic configuration message is transmitted.

FIG. 12 is an explanatory diagram for explaining an example of a control information region in which a dynamic configuration message is transmitted. Referring to FIG. 12, a diagrammatic format of the 0th subframe and the 5th subframe of each radio frame is illustrated. SIB1 is provided in the center of the PDSCH band of the 5th subframe. The dynamic configuration message may be transmitted on the enhanced physical downlink control channel (E-PDCCH) provided in the PDSCH band of the 0th or the 5th subframe, for example. Otherwise, the dynamic configuration message may also be transmitted in a newly defined control information region in the PDCCH. By defining a new control information region for transmitting the dynamic configuration message in the E-PDCCH or the PDCCH, signaling the link direction configuration on a 10 ms cycle at minimum becomes possible.

Note that increasing the signaling frequency causes increased signaling overhead. In other words, from the perspective of throughput, there is a trade-off relationship between the link direction configuration update responsiveness and the signaling overhead. Consequently, the signaling cycle of the dynamic TDD configuration may be adaptively configured for each system so as to optimize throughput, for example. In addition, signaling may also be conducted to inform the dynamic TDD terminal of such an adaptively configured signaling cycle.

(3) Effects on ACK/NACK Transmitted by Legacy Terminal

The acknowledgement (ACK) and negative acknowledgement (NACK) are the basic control signaling that form the base of the hybrid automatic repeat request (HARQ), a mechanism for ensuring the reliability of data transmission. The offset between the timing of a downlink transmission and the timing of an ACK/NACK is defined for each link direction configuration in Table 10.1.3.1-1 of 3GPP TS 36.213 (see Table 1).

TABLE 1

Offset between downlink transmission and ACK/NACK
(See 3GPP TS 36.213 Table 10.1.3.1-1)

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Figure 13:
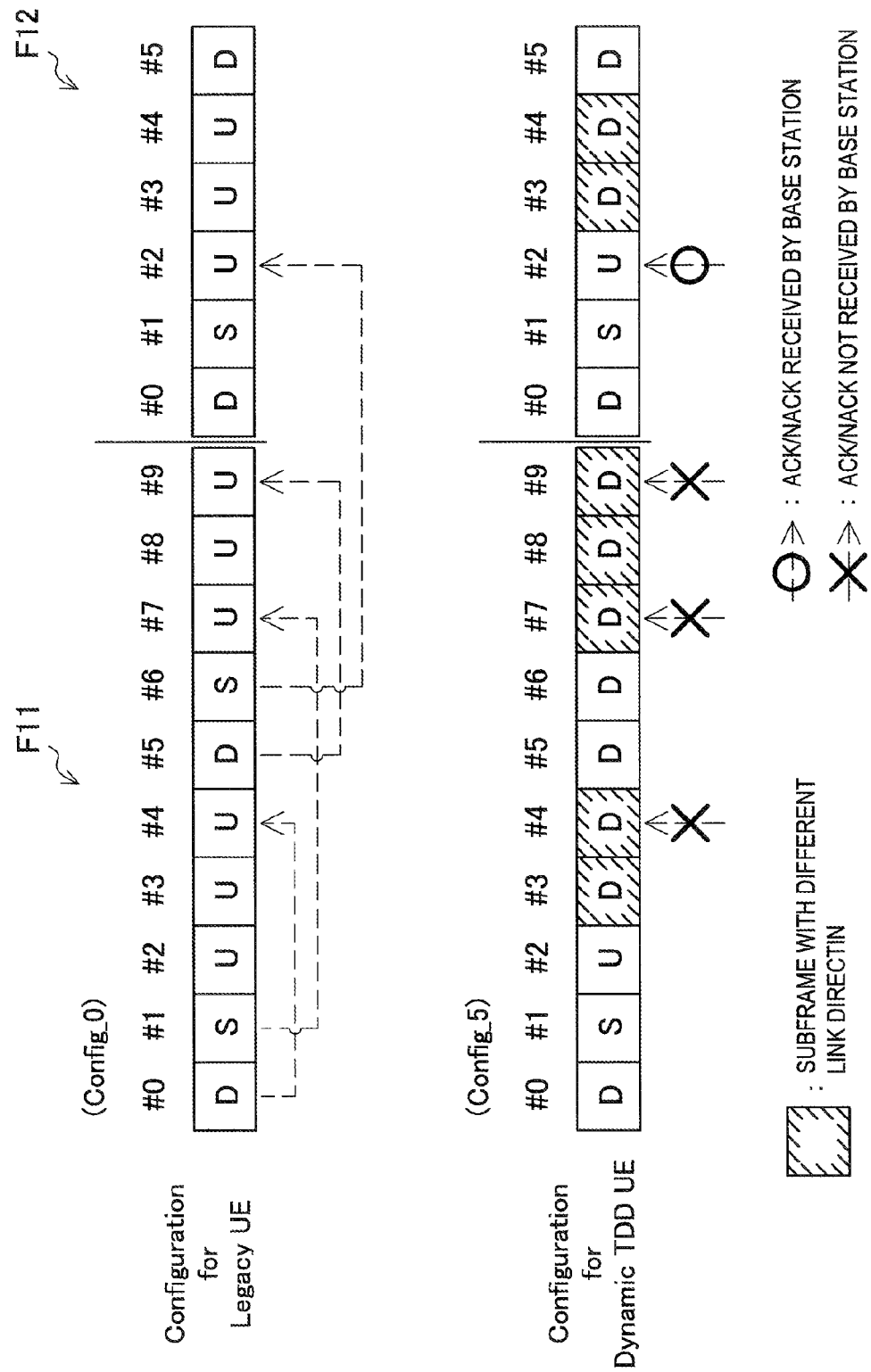
FIG. 13 is an explanatory diagram for explaining a first example of the effects of link direction differences for control signaling involving a legacy terminal.

Table 1 illustrates timing offsets between a downlink transmission and an ACK/NACK associated with that downlink transmission, in units of numbers of subframes. The transmission timing of an ACK/NACK will be described while also referencing FIG. 13. The top part of FIG. 13 illustrates two consecutive radio frames F11 and F12 configured with Configuration 0. In the radio frames F11 and F12, downlink transmission may occur in the 0th, 1st, 5th, and 6th subframes. Referring to the Configuration 0 row in Table 1, an ACK/NACK in response to a downlink transmission in the 0th subframe may be transmitted in the 4th subframe indicating an offset of 4. An ACK/NACK in response to a downlink transmission in the 1st subframe may be transmitted in the 7th subframe indicating an offset of 6. An ACK/NACK in response to a downlink transmission in the 5th subframe may be transmitted in the 9th subframe indicating an offset of 4. An ACK/NACK in response to a downlink transmission in the 6th subframe may be transmitted in the 2nd subframe (of the next radio frame) indicating an offset of 6. The correspondence relationships of such timings are indicated by the dashed arrows in FIG. 13. A device participating in radio communication stores a standardized table like Table 1 in advance, and may decide on a transmission timing of an ACK/NACK in response to a downlink transmission by referencing that table.

However, if the dynamic TDD configuration and the legacy configuration differ, subframes with differing link directions exist between these two configurations. In the example of FIG. 13, in the bottom part, Configuration 5 is configured as the dynamic TDD configuration. Suppose that the legacy configuration is Configuration 0. In this case, the link direction is different in the 3rd, 4th, 7th, 8th, and 9th subframes. Since the base station actually operates according to the dynamic TDD configuration, even if the legacy terminal transmits ACK/NACK in response to a downlink signal in the 4th, 7th, or 9th subframe, that ACK/NACK will not be received by the base station. If the ACK/NACK is lost, even if the corresponding downlink transmission was conducted normally, the base station is unable to recognize this fact, and may resend already-transmitted data. Consequently, radio resources may be wasted, and system throughput may be lowered.

Accordingly, in an embodiment, downlink transmission to the legacy terminal is only scheduled in a subframe for which link direction differences do not occur in the subframe for the associated ACK/NACK transmission. The subframe for ACK/NACK transmission associated with a downlink transmission is indicated by the legacy configuration entries in Table 1. Whether or not a link direction difference occurs in the relevant subframe may be determined from the link direction of the relevant subframe in the legacy configuration. If the relevant subframe is designated an uplink subframe in the legacy configuration, a link direction collision does not occur. Otherwise, a link direction collision occurs. Herein, referring to FIG. 2, the 2nd subframe is an uplink subframe in all configurations. Accordingly, if the legacy configuration is Configuration 0, for example, the base station schedules downlink transmission to the legacy terminal in the 6th subframe (no scheduling in other downlink subframes). As a result, it becomes possible to reliably receive, in the 2nd subframe, the ACK/NACK from the legacy terminal in response to the relevant downlink transmission, irrespectively of the dynamic TDD configuration.

(4) Effects on ACK/NACK Transmitted to Legacy Terminal

The offset between the timing of an uplink transmission and the timing of an ACK/NACK from the base station is defined for each link direction configuration in Table 9.1.2-1 of 3GPP TS 36.213 (see Table 2).

TABLE 2

Offset between uplink transmission and ACK/NACK
(See 3GPP TS 36.213 Table 9.1.2-1)

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

Figure 14:
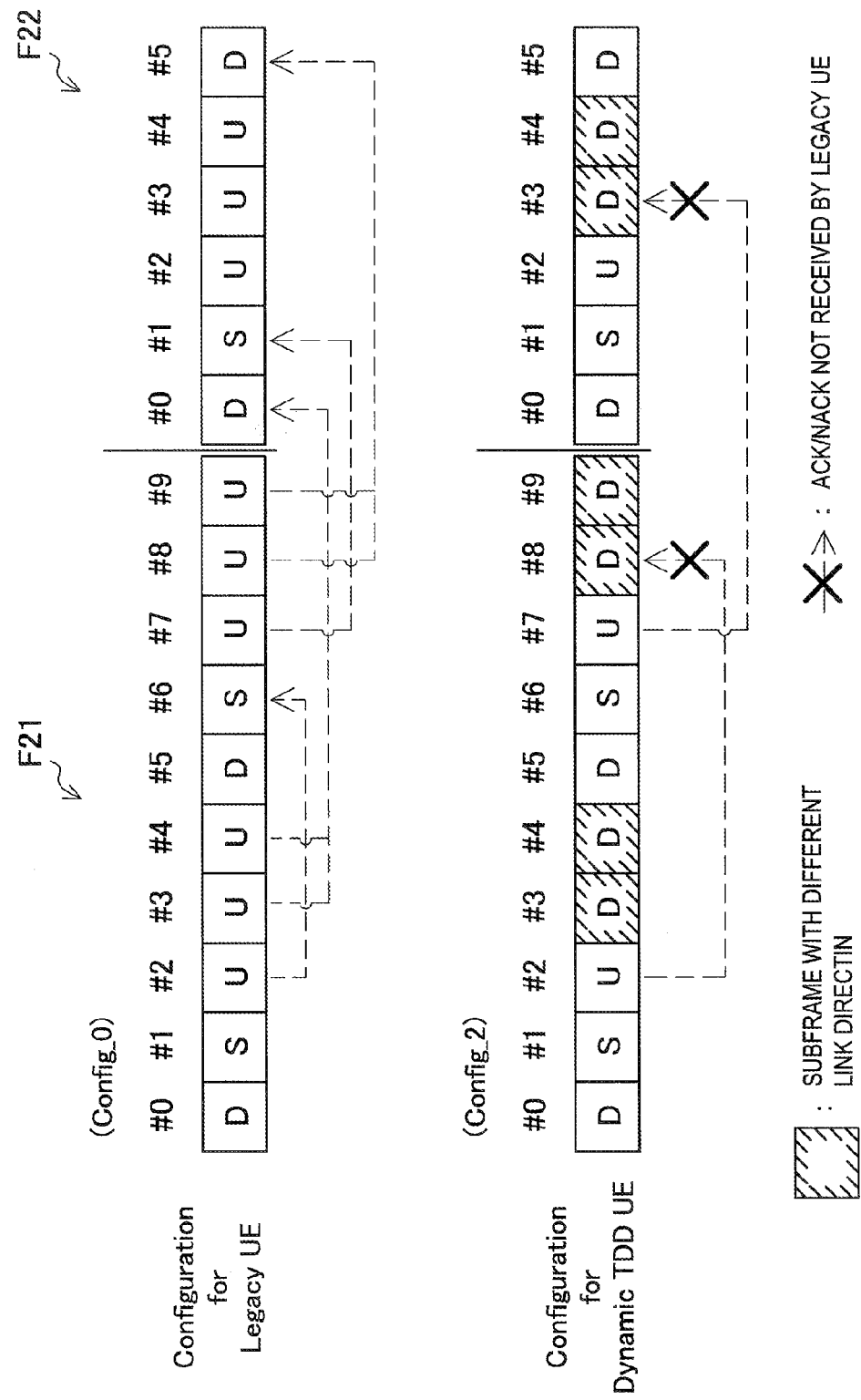
FIG. 14 is an explanatory diagram for explaining a first example of the effects of link direction differences for control signaling involving a legacy terminal.

Table 2 illustrates timing offsets between an uplink transmission and an ACK/NACK associated with that uplink transmission, in units of numbers of subframes. The transmission timing of an ACK/NACK will be described while also referencing FIG. 14. The top part of FIG. 14 illustrates two consecutive radio frames F21 and F22 configured with Configuration 0. In the radio frames F21 and F22, uplink transmission may occur in the 2nd, 3rd, 4th, 7th, 8th, and 9th subframes. Referring to the Configuration 0 row in Table 2, an ACK/NACK in response to an uplink transmission in the 2nd subframe may be transmitted in the 6th subframe after an offset of 4. An ACK/NACK in response to an uplink transmission in the 3rd subframe may be transmitted in the 0th subframe (of the next radio frame) after an offset of 7. An ACK/NACK in response to an uplink transmission in the 4th subframe may be transmitted in the 0th subframe (of the next radio frame) after an offset of 6. An ACK/NACK in response to an uplink transmission in the 7th subframe may be transmitted in the 1st subframe (of the next radio frame) after an offset of 4. An ACK/NACK in response to an uplink transmission in the 8th subframe may be transmitted in the 5th subframe (of the next radio frame) after an offset of 7. An ACK/NACK in response to an uplink transmission in the 9th subframe may be transmitted in the 5th subframe (of the next radio frame) after an offset of 6. The correspondence relationships of such timings are indicated by the dashed arrows in FIG. 14. A device participating in radio communication stores a standardized table like Table 2 in advance, and may decide on a transmission timing of an ACK/NACK in response to an uplink transmission by referencing that table.

However, if the dynamic TDD configuration and the legacy configuration differ, subframes with differing link directions exist between these two configurations. In the example of FIG. 14, in the bottom part, Configuration 2 is configured as the dynamic TDD configuration. Suppose that the legacy configuration is Configuration 0. In this case, the link direction is different in the 3rd, 4th, 8th, and 9th subframes. When the base station operates according to the dynamic TDD configuration, the base station transmits an ACK/NACK in response to an uplink transmission in the 2nd and 7th subframes in the 8th subframe and the 3rd subframe (of the next radio frame), respectively. However, in the legacy configuration of Configuration 0, since the 3rd and the 8th subframes are designated uplink subframes, the legacy terminal does not receive these ACK/NACK. If the ACK/NACK is lost, even if the corresponding uplink transmission was conducted normally, the legacy terminal is unable to recognize this fact, and may resend already-transmitted data. Consequently, radio resources may be wasted, and system throughput may be lowered.

Accordingly, in an embodiment, the subframe for transmitting an ACK/NACK in response to an uplink transmission from the legacy terminal is decided by referencing the legacy configuration entries in Table 2. According to this standard, in the example of FIG. 14, the base station transmits an ACK/NACK in response to an uplink transmission in the 2nd and 7th subframes in the 6th subframe and the 1st subframe (of the next radio frame), respectively. The 1st and 6th subframes are downlink subframes in both the legacy configuration and the dynamic TDD configuration. For this reason, the legacy terminal is able to receive these ACK/NACK normally.

(5) Effects on UL Grant Transmitted to Legacy Terminal

An uplink grant (UL grant) is control signaling for informing the terminal device that uplink transmission has been scheduled. The timing offset between an uplink transmission and an uplink grant is defined for each link direction configuration in Table 8-2 of 3GPP TS 36.213 (see Table 3).

TABLE 3

| Offset between UL grant and uplink transmission (See 3GPP TS 36.213 Table 8-2) | | | | | | | | | | |
|---|---|---|---|---|---|---|---|---|---|---|
| TDD UL/DL | subframe index n | | | | | | | | | |
| Configuration | 0 | 1 | 2 | 3 | 4 | 5 | 6 | 7 | 8 | 9 |
| 0 | | | 4 | 6, 7 | | | 4 | 6, 7 | | |
| 1 | | | 6 | | 4 | | 6 | | | 4 |
| 2 | | | | 4 | | | | 4 | | |
| 3 | 4 | | | | | | | 4 | 4 | |
| 4 | | | | | | | | 4 | 4 | |
| 5 | | | | | | | | 4 | | |
| 6 | 7 | 7 | | | | 7 | 7 | | | 5 |

Figure 15:
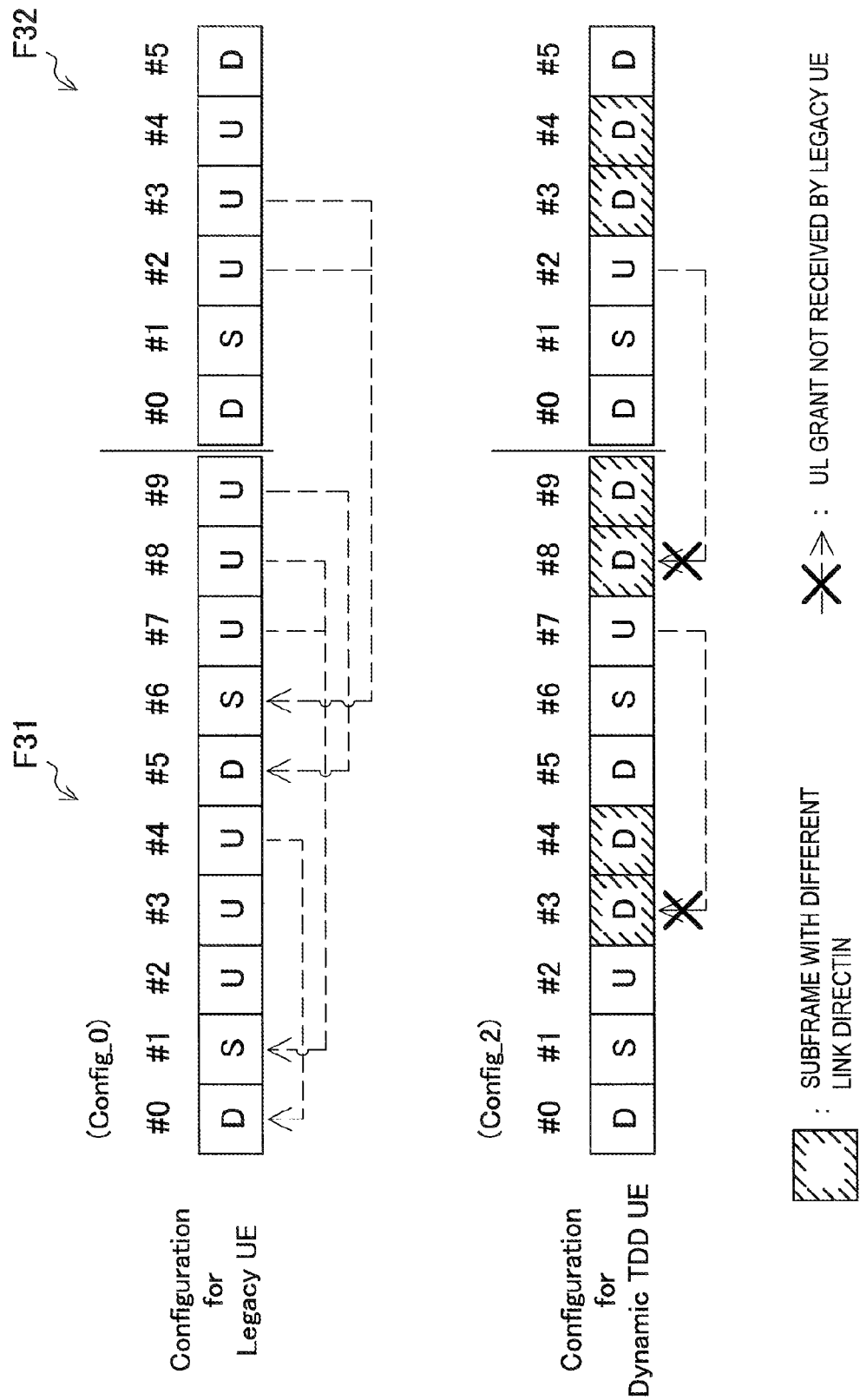
FIG. 15 is an explanatory diagram for explaining a first example of the effects of link direction differences for control signaling involving a legacy terminal.

Table 3 illustrates timing offsets between an uplink transmission and a UL grant associated with that uplink transmission, in units of numbers of subframes. The transmission timing of a UL grant will be described while also referencing FIG. 15. The top part of FIG. 15 illustrates two consecutive radio frames F31 and F32 configured with Configuration 0. In the radio frames F31 and F32, uplink transmission may occur in the 2nd, 3rd, 4th, 7th, 8th, and 9th subframes. Referring to the Configuration 0 row in Table 3, a UL grant for an uplink transmission in the 2nd subframe may be transmitted in the 6th subframe (of the previous radio frame) indicating an offset of 6. A UL grant for an uplink transmission in the 3rd subframe may be transmitted in the 6th subframe (of the previous radio frame) indicating an offset of 7. A UL grant for an uplink transmission in the 4th subframe may be transmitted in the 0th subframe indicating an offset of 4. A UL grant for an uplink transmission in the 7th subframe may be transmitted in the 1st subframe indicating an offset of 6. A UL grant for an uplink transmission in the 8th subframe may be transmitted in the 1st subframe indicating an offset of 7. A UL grant for an uplink transmission in the 9th subframe may be transmitted in the 5th subframe indicating an offset of 4. The correspondence relationships of such timings are indicated by the dashed arrows in FIG. 15. A device participating in radio communication stores a standardized table like Table 3 in advance, and may decide on a transmission timing of a UL grant for an uplink transmission by referencing that table.

However, if the dynamic TDD configuration and the legacy configuration differ, subframes with differing link directions exist between these two configurations. In the example of FIG. 15, in the bottom part, Configuration 2 is configured as the dynamic TDD configuration. Suppose that the legacy configuration is Configuration 0. In this case, the link direction is different in the 3rd, 4th, 8th, and 9th subframes. When the base station operates according to the dynamic TDD configuration, the base station transmits a UL grant for an uplink transmission in the 2nd and 7th subframes in the 8th subframe (of the previous radio frame) and the 3rd subframe, respectively. However, in the legacy configuration of Configuration 0, since the 3rd and the 8th subframes are designated uplink subframes, the legacy terminal does not receive these UL grants. If the UL grant is not received, the legacy terminal does not execute uplink transmission, and thus uplink traffic stagnates.

Accordingly, in an embodiment, the subframe for transmitting an uplink grant corresponding to an uplink transmission from the legacy terminal is decided by referencing the legacy configuration entries in Table 3. For example, according to this standard, in the example of FIG. 15, the base station transmits a UL grant for an uplink transmission in the 2nd and 7th subframes in the 6th subframe (of the previous radio frame) and the 1st subframe, respectively. The 1st and 6th subframes are downlink subframes in both the legacy configuration and the dynamic TDD configuration. For this reason, the legacy terminal is able to receive these UL grants normally.

<2.Configuration of Communication Control System>

[2-1. Overview of System]

Figure 16:
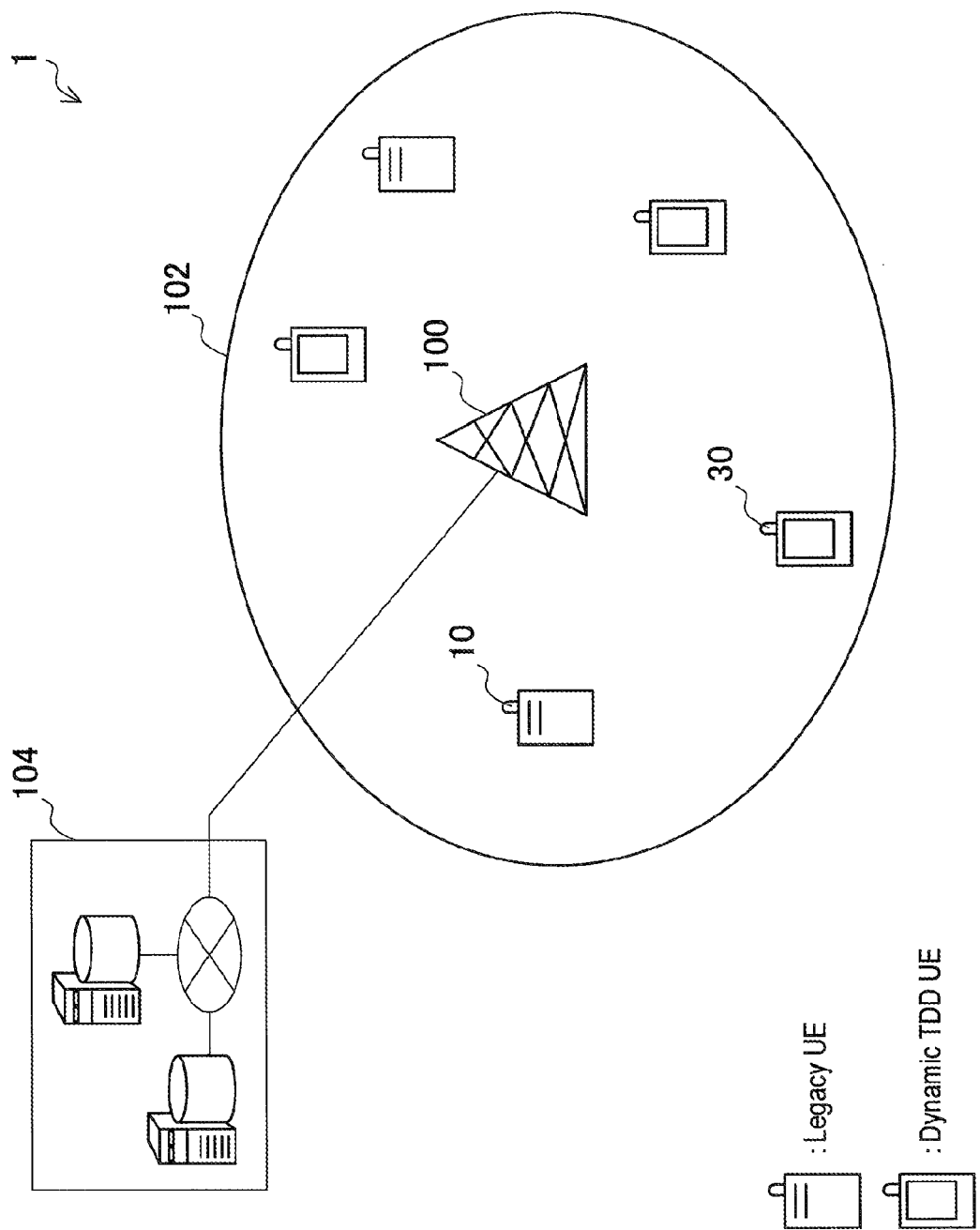
FIG. 16 is an explanatory diagram illustrating an example of a configuration of a communication control system according to an embodiment.

FIG. 16 is an explanatory diagram illustrating an example of a configuration of a communication control system 1 according to an embodiment which is applied with the technology of the present disclosure. Referring to FIG. 16, the communication control system 1 includes a base station 100. The base station (eNB) 100 provides radio communication service in accordance with the TD-LTE scheme to a legacy terminal 104 and a dynamic TDD terminal 30 positioned inside a cell 102. The base station 100 is connected to a core network 104, typically realized as the Evolved Packet Core (EPC). The core network 104 includes various control nodes, such as the Mobility Management Entity (MME), the Serving Gateway (S-GW), and the P-GW, for example.

The legacy terminal 10 is a terminal device that operates according to a legacy configuration. The dynamic TDD terminal 30 is a terminal device capable of operating according to a dynamic TDD configuration. The dynamic TDD terminal 30 may also be capable of additionally operating according to a legacy configuration. The control function that configures the legacy configuration for one or more legacy terminals 10 and configures the dynamic TDD configuration for one or more dynamic TDD terminals 30 may be placed in the base station 100, or any control node that communicates with these terminal devices via the base station 100. As an example, the following description assumes that the base station 100 includes this control function.

[2-2. Exemplary Configuration of Legacy Terminal]

Figure 17:
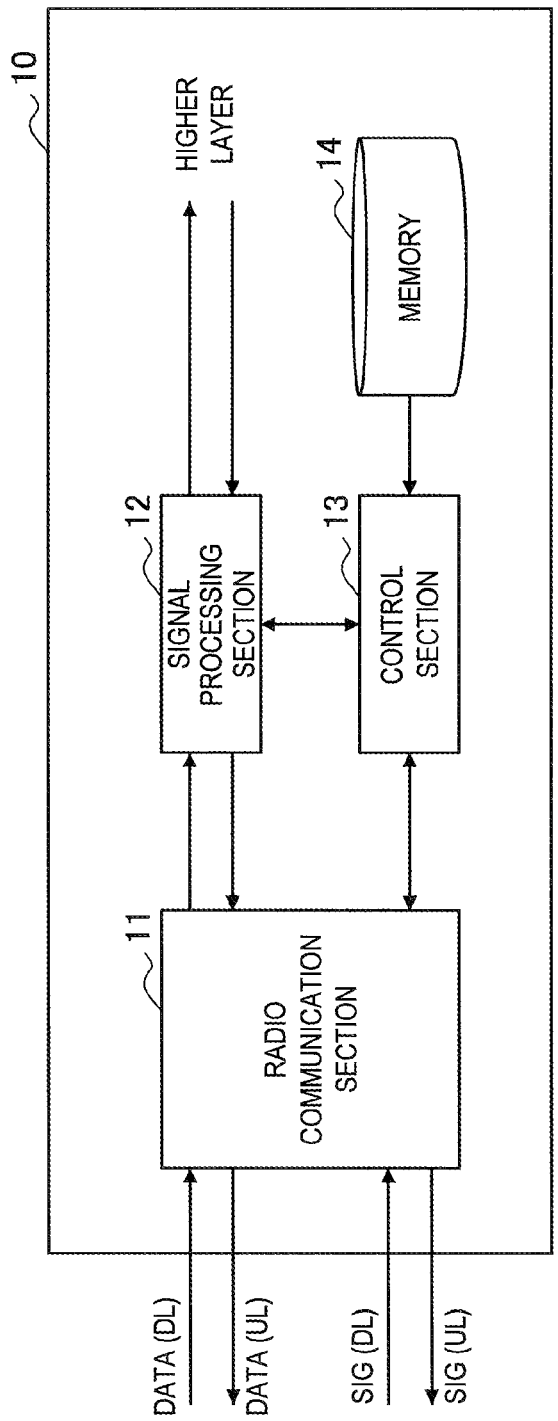
FIG. 17 is a block diagram illustrating an example of a configuration of a legacy terminal.

FIG. 17 is a block diagram illustrating an example of a configuration of the legacy terminal 10. Referring to FIG. 17, the legacy terminal 10 is equipped with a radio communication section 11, a signal processing section 12, a control section 13, and memory 14.

(1) Radio Communication Section

The radio communication section 11 is a communication interface for transmitting and receiving radio signals between the legacy terminal 10 and the base station 100. The radio communication section 11 includes one or more antennas (not illustrated) and a radio frequency (RF) circuit. The radio communication section 11 receives a downlink signal transmitted from the base station 100, and conducts amplification, frequency conversion, and analogue-to-digital (AD) conversion of the received signal. In addition, the radio communication section 11 conducts digital-to-analogue (DA) conversion, frequency conversion, and amplification of a signal to be transmitted, and transmits an uplink signal to the base station 100.

A downlink signal received by the radio communication section 11 includes a downlink data signal and downlink signaling. The downlink signaling includes an SI message informing the legacy terminal 10 of the legacy configuration, an ACK/NACK in response to an uplink transmission, and a UL grant. Also, an uplink signal transmitted by the radio communication section 11 includes an uplink data signal and uplink signaling. The uplink signaling includes a buffer status report indicating the amount of uplink data signal traffic being buffered, and an ACK/NACK in response to a downlink transmission.

(2) Signal Processing Section

The signal processing section 12 includes a signal processing circuit for conducting equalization, demodulation, and decoding of a received signal input from the radio communication section 11, as well as encoding and modulation of a signal to be transmitted that is output to the radio communication section 11. The signal processing section 12 is connected to a processor (not illustrated) that realizes processing in a higher layer, for example. The signal processing section 12 then outputs data included in a demodulated and decoded received signal to a higher layer. Also, the signal processing section 12 encodes and modulates a signal to be transmitted that includes data input from a higher layer.

(3) Control Section

The control section 13 controls radio communication by the legacy terminal 10 according to the TD-LTE scheme. For example, the control section 13 configures link directions per subframe in the radio communication section 11 and the signal processing section 12 according to a legacy configuration specified in an SI message received by the radio communication section 11. Also, the control section 13 causes the radio communication section 11 to receive a downlink signal according to a downlink assignment received by the radio communication section 11, and causes the radio communication section 11 to reply with an ACK if reception is successful, or with a NACK if reception is unsuccessful. Also, the control section 13 causes the radio communication section 11 to transmit an uplink signal according to an uplink grant received by the radio communication section 11, and causes the radio communication section 11 to receive an ACK or a NACK in response to that uplink transmission. The control section 13 may decide the transmission/reception timings of the respective control signaling (that is, the ACK/NACK in response to a downlink transmission, the ACK/NACK in response to an uplink transmission, and the UL grant) by referencing legacy configuration entries in a table stored in the memory 14 (Tables 1, 2, and 3 discussed earlier). In addition, in a downlink subframe not configured as an MBSFN subframe, the control section 13 causes the radio communication section 11 to receive the CRS and execute synchronization tracking. Also, the control section 13 periodically generates a buffer status report indicating the amount of uplink data signal traffic being buffered, and transmits the generated buffer status report from the radio communication section 11 to the base station 100.

(4) Memory

The memory 14 is a storage medium that stores data and programs used in order for the control section 13 to control radio communication by the legacy terminal 10. For example, the memory 14 stores an identifier for the currently configured legacy configuration. In addition, the memory 14 stores in advance a first table that associates downlink transmission timings and corresponding ACK/NACK timings (Table 1), a second table that associates uplink transmission timings and corresponding ACK/NACK timings (Table 2), and a third table that associates uplink transmission timings and corresponding UL grant timings (Table 3).

[2-3. Exemplary Configuration of Dynamic TDD Terminal]

Figure 18:
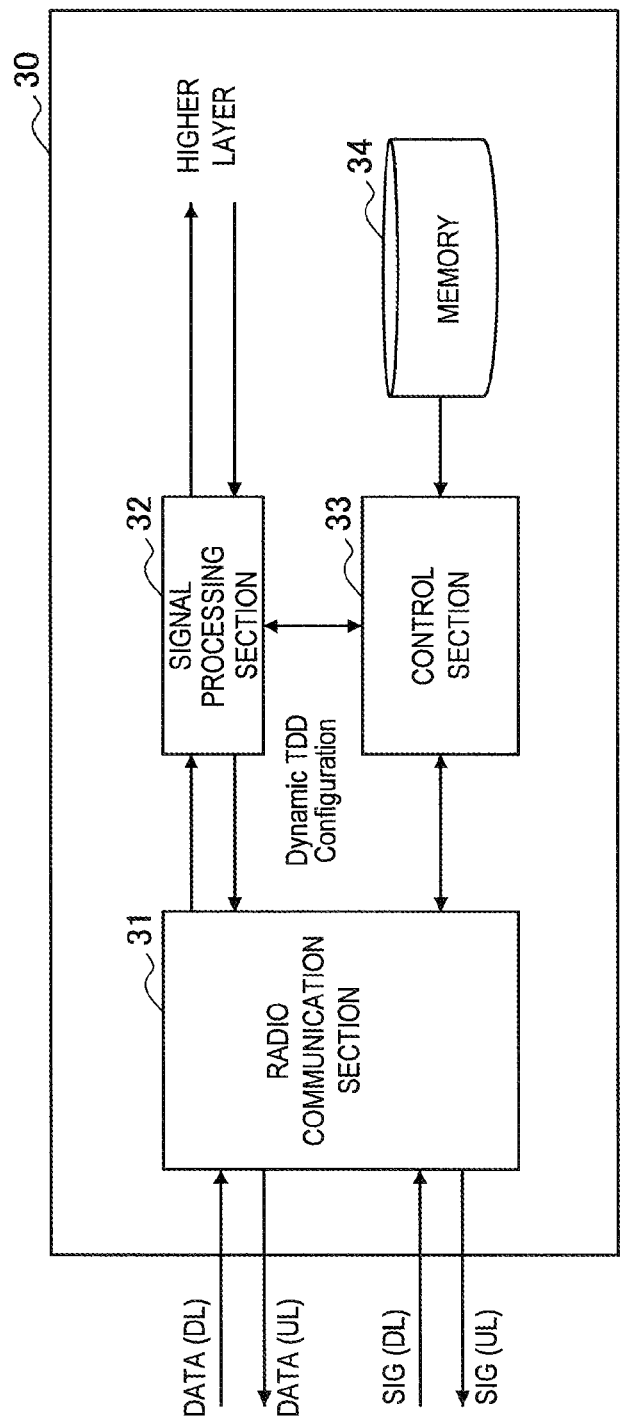
FIG. 18 is a block diagram illustrating an example of a configuration of a dynamic TDD terminal according to an embodiment.

FIG. 18 is a block diagram illustrating an exemplary configuration of a dynamic TDD terminal 30 according to the present embodiment. Referring to FIG. 18, the dynamic TDD terminal 30 is equipped with a radio communication section 31, a signal processing section 32, a control section 33, and a memory 34.

(1) Radio Communication Section

The radio communication section 31 is a communication interface for transmitting and receiving radio signals between the dynamic TDD terminal 30 and the base station 100. The radio communication section 31 includes one or more antennas (not illustrated) and an RF circuit. The radio communication section 31 receives a downlink signal transmitted from the base station 100, and conducts amplification, frequency conversion, and AD conversion of the received signal. In addition, the radio communication section 31 conducts DA conversion, frequency conversion, and amplification of a signal to be transmitted, and transmits an uplink signal to the base station 100.

A downlink signal received by the radio communication section 31 includes a downlink data signal and downlink signaling. The downlink signaling includes a dynamic configuration message informing the dynamic TDD terminal 30 of the dynamic TDD configuration, an ACK/NACK in response to an uplink transmission, and a UL grant. Also, an uplink signal transmitted by the radio communication section 31 includes an uplink data signal and uplink signaling. The uplink signaling includes a buffer status report indicating the amount of uplink data signal traffic being buffered, and an ACK/NACK in response to a downlink transmission.

(2) Signal Processing Section

The signal processing section 32 includes a signal processing circuit for conducting equalization, demodulation, and decoding of a received signal input from the radio communication section 31, as well as encoding and modulation of a signal to be transmitted that is output to the radio communication section 31. The signal processing section 32 is connected to a processor (not illustrated) that realizes processing in a higher layer, for example. The signal processing section 32 then outputs data included in a demodulated and decoded received signal to a higher layer. Also, the signal processing section 32 encodes and modulates a signal to be transmitted that includes data input from a higher layer.

(3) Control Section

The control section 33 controls radio communication by the dynamic TDD terminal 30 according to the TD-LTE scheme. For example, control section 33 causes the radio communication section 31 to receive a dynamic configuration message transmitted in a control information region that differs from the SIB. Such a dynamic configuration message is signaled from the base station 100 on a shorter cycle than the SI message signaling cycle. Subsequently, the control section 33 configures link directions per subframe in the radio communication section 31 and the signal processing section 32 according to a dynamic TDD configuration specified in a dynamic configuration message. Also, the control section 33 causes the radio communication section 31 to receive a downlink signal according to a downlink assignment received by the radio communication section 31, and causes the radio communication section 31 to reply with an ACK if reception is successful, or with a NACK if reception is unsuccessful. Also, the control section 33 causes the radio communication section 31 to transmit an uplink signal according to an uplink grant received by the radio communication section 31, and causes the radio communication section 31 to receive an ACK or a NACK in response to that uplink transmission. The control section 33 may decide the transmission/reception timings of the respective control signaling (that is, the ACK/NACK in response to a downlink transmission, the ACK/NACK in response to an uplink transmission, and the UL grant) by referencing dynamic TDD configuration entries in a table stored in the memory 34 (Tables 1, 2, and 3 discussed earlier). In addition, in a downlink subframe, the control section 33 causes the radio communication section 31 to receive the CRS and execute synchronization tracking. Also, the control section 33 periodically generates a buffer status report indicating the traffic amount of buffered uplink data signals, and transmits the generated buffer status report from the radio communication section 31 to the base station 100.

(4) Memory

The memory 34 is a storage medium that stores data and programs used in order for the control section 33 to control radio communication by the dynamic TDD terminal 30. For example, the memory 34 stores an identifier for the currently configured dynamic TDD configuration. In addition, the memory 34 stores in advance a first table that associates downlink transmission timings and corresponding ACK/NACK timings (Table 1), a second table that associates uplink transmission timings and corresponding ACK/NACK timings (Table 2), and a third table that associates uplink transmission timings and corresponding UL grant timings (Table 3).

(5) Dual Mode Support

Note that the dynamic TDD terminal 30 may also be capable of operating in both a first operating mode that configures link directions according to a legacy configuration similarly to the legacy terminal 10, and a second operating mode that configures link directions according to a dynamic TDD configuration on a shorter cycle. For example, the dynamic TDD terminal 30 may infrequently receive an SI message (that is, the first operating mode) in idle mode (RRC_Idle), and frequently receive a dynamic configuration message (that is, the second operating mode) in active mode (RRC_Connected). As a result, a rise in power consumption while in idle mode may be avoided. Also, in active mode, the dynamic TDD terminal 30 may also receive dynamic configuration messages in only a designated period from the base station 100.

[2-4. Exemplary Configuration of Communication Control Device]

Figure 19:
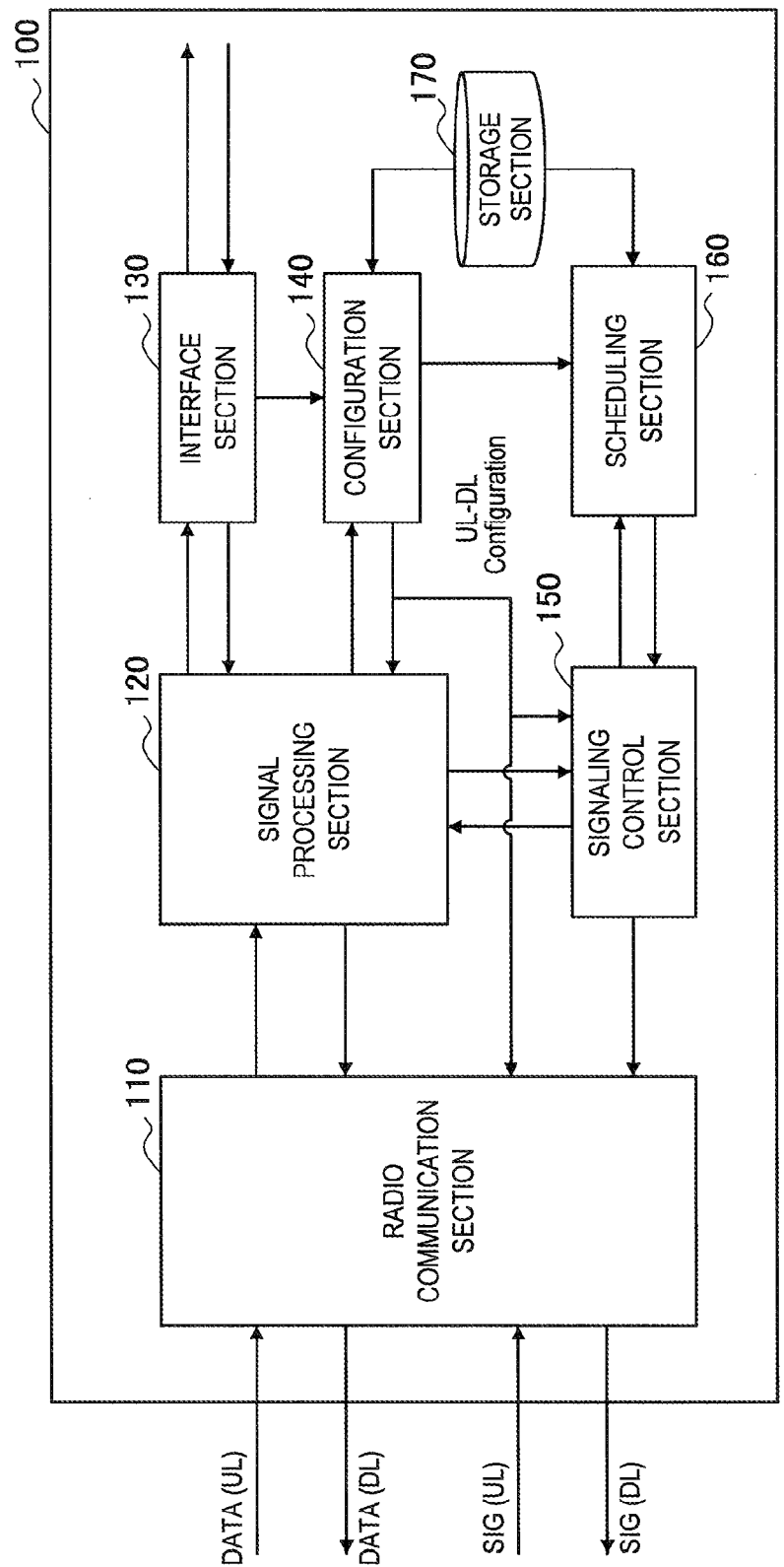
FIG. 19 is a block diagram illustrating an example of a configuration of a communication control device according to an embodiment.

In the present embodiment, the base station 100 acts as a communication control device that controls radio communication conducted by one or more terminal devices according to a time-division duplex (TDD) scheme. FIG. 19 is a block diagram illustrating an example of a configuration of the base station 100. Referring to FIG. 19, the base station 100 is equipped with a radio communication section 110, a signal processing section 120, an interface section 130, a configuration section 140, a signaling control section 150, a scheduling section 160, and a storage section 170.

(1) Radio Communication Section

The radio communication section 110 is a communication interface for transmitting and receiving radio signals between the base station 100 and one or more terminal devices. The radio communication section 110 includes one or more antennas (not illustrated) and an RF circuit. The radio communication section 110 receives an uplink signal transmitted from a terminal device, and conducts amplification, frequency conversion, and AD conversion of the received signal.

An uplink signal received by the radio communication section 110 includes an uplink data signal and uplink signaling. The uplink signaling includes a buffer status report from each terminal device, as well as an ACK/NACK in response to a downlink transmission. In addition, a downlink signal transmitted by the radio communication section 110 includes a downlink data signal and downlink signaling. The downlink signaling may include a UL grant associated with an uplink transmission, as well as the signaling SIG0, SIG1, SIG2, and SIG3 discussed earlier. The downlink signaling includes an SI message for notifying the legacy configuration, a dynamic configuration message for notifying the dynamic TDD configuration, an ACK/NACK in response to an uplink transmission, and a UL grant.

(2) Signal Processing Section

The signal processing section 120 includes a signal processing circuit for conducting equalization, demodulation, and decoding of a received signal input from the radio communication section 110, as well as encoding and modulation of a signal to be transmitted that is output to the radio communication section 110. The signal processing section 120 outputs data included in a demodulated and decoded received signal to the interface section 130. Also, the signal processing section 120 encodes and modulates a signal to be transmitted that includes data input from the interface section 130.

(3) Interface Section

The interface section 130 includes an interface group such as the X2 interface by which the base station 100 communicates with other base stations, and the S1 interface by which the base station 100 communicates with a control node on the core network 104. Each communication interface in the interface section 130 may be a wired communication interface or a wireless communication interface. The interface section 130 receives buffer signaling from a P-GW, for example. Such buffer signaling indicates the traffic amount of buffered downlink data signals for each terminal device. The interface section 130 outputs received buffer signaling to the configuration section 140.

(4) Configuration Section

The configuration section 140 configures, for each radio frame that includes multiple subframes, a link direction configuration expressing link directions per subframe. More specifically, the configuration section 140 configures a legacy configuration for a first terminal group that includes one or more legacy terminals 10. In addition, the configuration section 140 configures a dynamic TDD configuration for a second terminal group that includes one or more dynamic TDD terminals 30. The configuration section 140 may select the legacy configuration and the dynamic TDD configuration to configured in each radio frame on the basis of the UL-DL traffic ratio. For example, if more uplink traffic is being buffered, the configuration section 140 may select a link direction configuration with a higher uplink ratio. Similarly, if more downlink traffic is being buffered, the configuration section 140 may select a link direction configuration with a higher downlink ratio.

In the present embodiment, the configuration section 140 supports two types of configuration modes: a semi-static mode and a dynamic mode. In the semi-static mode, the configuration section 140 configures the dynamic TDD configuration with the same link direction configuration as the legacy configuration. In dynamic mode, the configuration section 140 may configure the dynamic TDD configuration with a link direction configuration that differs from the legacy configuration (configuring the same link direction configuration for both is also possible). A transition between semi-static mode and dynamic mode may be triggered by a buffer status report from the legacy terminal 10 or buffer signaling from the P-GW. An example of such mode transitions will be later described in detail.

In dynamic mode, the configuration section 140 typically selects a dynamic TDD configuration to configure in the radio communication section 110 and the signal processing section 120 from a set of configurations limited on the basis of the legacy configuration configured for the first terminal group.

For example, in the first technique, the configuration section 140 first configures a link direction configuration with a higher uplink ratio as the legacy configuration. Subsequently, the configuration section 140 configures a link direction configuration derived by substituting uplink subframes in the legacy configuration with downlink subframes as the dynamic TDD configuration.

As another example, in the second technique, the configuration section 140 first configures a link direction configuration with a higher downlink ratio as the legacy configuration. In addition, the configuration section 140 configures at least one downlink subframe in the configured legacy configuration as an MBSFN subframe. Subsequently, the configuration section 140 configures a link direction configuration derived by substituting MBSFN subframes in the legacy configuration with uplink subframes as the dynamic TDD configuration.

(5) Signaling Control Section

The signaling control section 150 signals the link direction configuration configured by the configuration section 140 to each terminal device. More specifically, on a signaling cycle C1, the signaling control section 150 signals the legacy configuration to the legacy terminal 10 by broadcasting an SI message. Also, on a signaling cycle C2 that is shorter than the signaling cycle C1, the signaling control section 150 signals the dynamic TDD configuration to the dynamic TDD terminal 30 by transmitting a dynamic configuration message. At timings when the link direction configuration is not updated, transmission of an SI message or a dynamic configuration message may be skipped.

In addition, the signaling control section 150 also controls the transmission of the cell-specific reference symbol (CRS) from the radio communication section 110. More specifically, the signaling control section 150 causes the CRS to be transmitted from the radio communication section 110 on the PDCCH and the PDSCH of a downlink subframe configured according to the dynamic TDD configuration.

In addition, when the UL-DL traffic ratio satisfies a predetermined condition, the signaling control section 150 may instruct a dynamic TDD terminal 30 capable of operating in both the first operating mode and the second operating mode discussed earlier (a dual mode terminal) to switch to the second operating mode (the mode that receives dynamic configuration messages). The predetermined condition herein may be the magnitude or speed of variation in UL-DL traffic ratio exceeding a threshold value, for example.

(6) Scheduling Section

The scheduling section 160 schedules the transmission of downlink signals from the base station 100 to each terminal device, and the transmission of uplink signals from each terminal device to the base station 100. The scheduling section 160 generates scheduling information indicating the scheduling result. The signaling control section 150 transmits the scheduling information generated by the scheduling section 160 (downlink assignments and uplink grants) to each terminal device via the radio communication section 110.

If the first technique is adopted, the scheduling section 160 does not grant uplink transmission to the legacy terminal 10 for subframes that have been changed from an uplink subframe to a downlink subframe in the dynamic TDD configuration. As a result, harmful interference produced by an uplink signal from the legacy terminal 10 may be prevented.

Additionally, the scheduling section 160 may schedule downlink transmission to the legacy terminal only in a subframe for which link direction differences do not occur in the subframe for the ACK/NACK transmission associated with that downlink transmission. The subframe for an ACK/NACK transmission associated with a downlink transmission is indicated by the legacy configuration entries in the first table stored by the storage section 170 (Table 1). As discussed earlier, whether or not a link direction difference occurs in the relevant subframe may be determined from the link direction of the relevant subframe in the legacy configuration. Also, the scheduling section 160 may decide the subframe for transmitting an ACK/NACK in response to an uplink transmission from the legacy terminal by referencing the legacy configuration entries in the second table stored by the storage section 170 (Table 2). Also, the scheduling section 160 may decide the subframe for transmitting a UL grant for an uplink transmission from the legacy terminal by referencing the legacy configuration entries in the third table stored by the storage section 170 (Table 3).

(7) Storage Section

The storage section 170 is a storage medium that stores data and programs used in order for the base station 100 to control radio communication in the cell 102. For example, the storage section 170 stores in advance a set of configuration candidates selectable by the base station 100. In addition, the storage section 170 stores identifiers for the legacy configuration and the dynamic TDD configuration configured by the configuration section 140. In addition, the storage section 170 stores in advance a first table that associates downlink transmission timings and corresponding ACK/NACK timings (Table 1), a second table that associates uplink transmission timings and corresponding ACK/NACK timings (Table 2), and a third table that associates uplink transmission timings and corresponding UL grant timings (Table 3).

[2-5. Configuration Mode Transitions]

(1) First Technique

Figure 20:
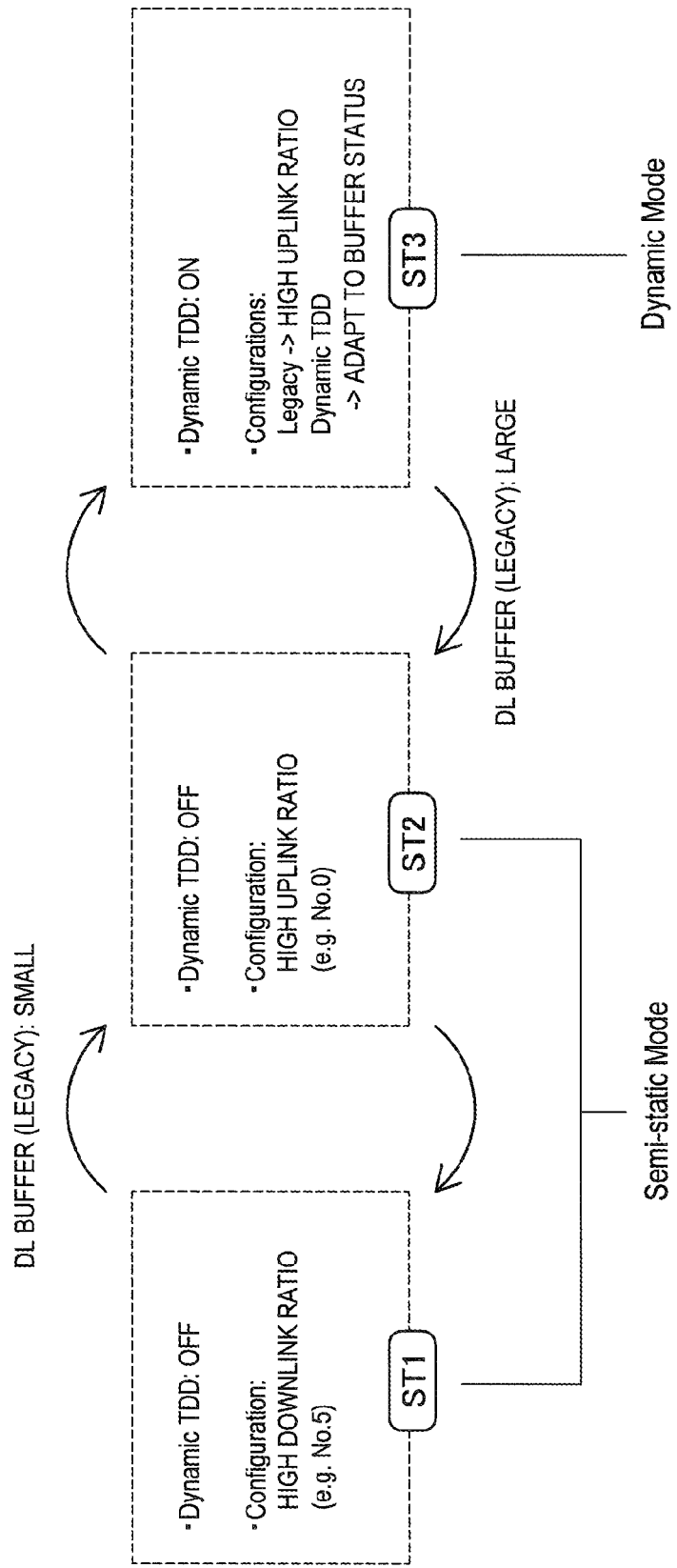
FIG. 20 is state transition diagram illustrating an example of transitions between configuration modes in the first technique.

FIG. 20 is state transition diagram illustrating an example of transitions between configuration modes in the first technique. Referring to FIG. 20, a first state ST1 and a second state ST2 belonging to semi-static mode as well as a third state ST3 belonging to dynamic mode are illustrated.

The state ST1 is the basic state in semi-static mode. In state ST1, updating of the dynamic TDD configuration on a short cycle is not conducted. The legacy configuration and the dynamic TDD configuration are both configured to a link direction configuration with a higher downlink ratio (for example, Configuration 5).

The state ST2 is a state that temporarily appears during the transition between semi-static mode and dynamic mode. In state ST2, the legacy configuration and the dynamic TDD configuration are both configured to a link direction configuration with a higher uplink ratio (for example, Configuration 0).

The state ST3 is the basic state in dynamic mode. In state ST3, updating of the dynamic TDD configuration on a short cycle is conducted. Similarly to the state ST2, the legacy configuration is configured to a link direction configuration with a higher uplink ratio. The dynamic TDD configuration may differ from the legacy configuration. In state ST3, the configuration section 140 adaptively varies the dynamic TDD configuration so that the UL-DL ratio of the dynamic TDD configuration tracks the UL-DL traffic ratio.

While operating in dynamic mode (that is, state ST3), the configuration section 140 transitions to semi-static mode if the amount of downlink traffic being buffered for the legacy terminal 10 in the P-GW exceeds a first threshold value, for example. In this case, the state of the configuration mode transitions from state ST3 to state ST2, and then to state ST1. As a result of a link direction configuration with a higher downlink ratio being configured in state ST1, the downlink traffic for the legacy terminal 10 is released from the buffer. Subsequently, while operating in semi-static mode (that is, state ST1), the configuration section 140 transitions to dynamic mode if the amount of downlink traffic being buffered for the legacy terminal 10 in the P-GW falls below a second threshold value. In this case, the state of the configuration mode transitions from state ST1 to state ST2, and then to state ST3. As a result of the configuration mode returning to dynamic mode in this way, making the link direction configuration of the dynamic TDD terminal 30 more rapidly track variations in UL-DL traffic ratio becomes possible again.

(2) Second Technique

Figure 21:
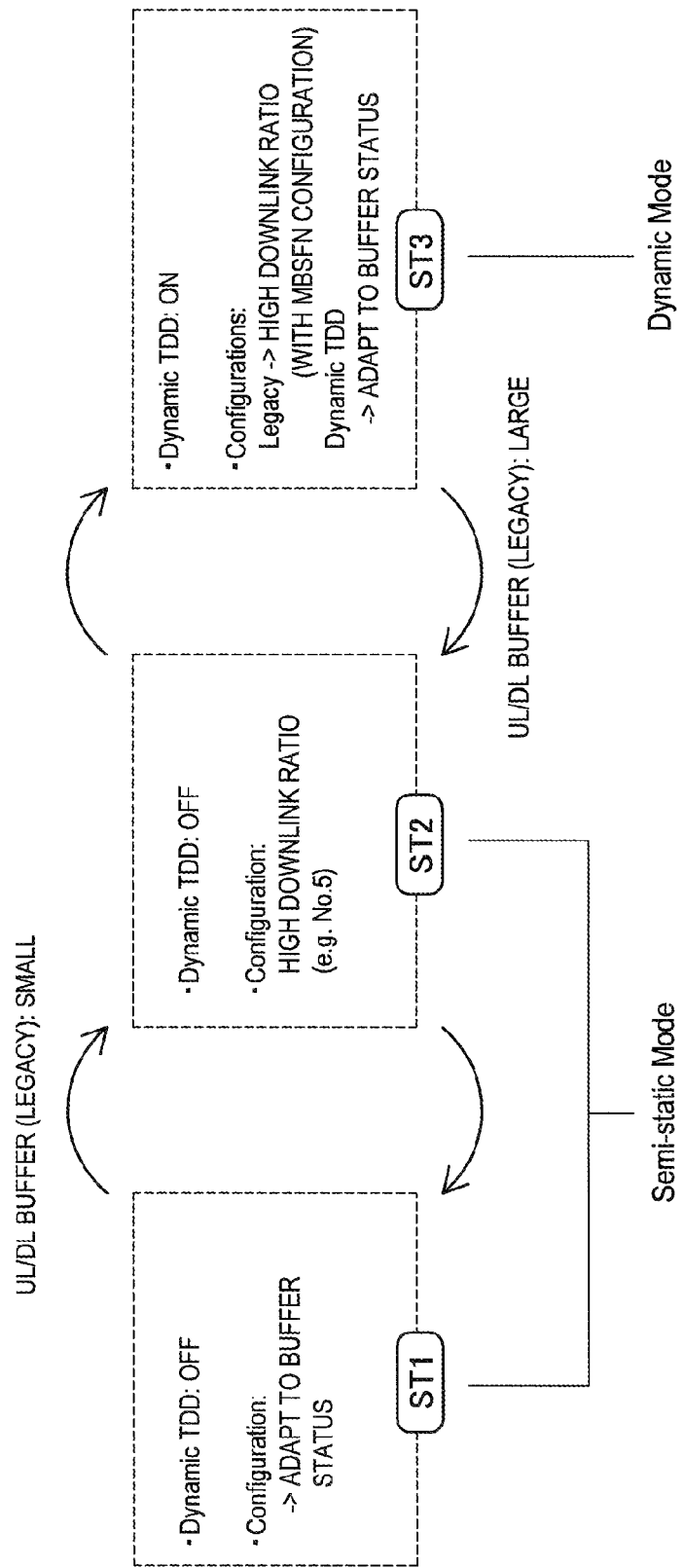
FIG. 21 is state transition diagram illustrating an example of transitions between configuration modes in the second technique.

FIG. 21 is state transition diagram illustrating an example of transitions between configuration modes in the second technique. Referring to FIG. 21, a first state ST1 and a second state ST2 belonging to semi-static mode as well as a third state ST3 belonging to dynamic mode are illustrated.

The state ST1 is the basic state in semi-static mode. In state ST1, updating of the dynamic TDD configuration on a short cycle is not conducted. The configuration section 140 adaptively varies the legacy configuration so as to track the UL-DL traffic ratio. The dynamic TDD configuration is identical to the legacy configuration.

The state ST2 is a state that temporarily appears during the transition between semi-static mode and dynamic mode. In state ST2, the legacy configuration and the dynamic TDD configuration are both configured to a link direction configuration with a higher downlink ratio (for example, Configuration 5).

The state ST3 is the basic state in dynamic mode. In state ST3, updating of the dynamic TDD configuration on a short cycle is conducted. Similarly to the state ST2, the legacy configuration is configured to a link direction configuration with a higher downlink ratio. At least one downlink subframe is configured as an MBSFN subframe. The dynamic TDD configuration may differ from the legacy configuration. In state ST3, the configuration section 140 adaptively varies the dynamic TDD configuration so that the UL-DL ratio of the dynamic TDD configuration tracks the UL-DL traffic ratio.

While operating in dynamic mode (that is, state ST3), the configuration section 140 transitions to semi-static mode if the amount of downlink traffic or the amount of uplink traffic being buffered for the legacy terminal 10 exceeds a first threshold value, for example. In this case, the state of the configuration mode transitions from state ST3 to state ST2, and then to state ST1. In state ST1, the traffic being buffered for the legacy terminal 10 is released from the buffer. Subsequently, while operating in semi-static mode (that is, state ST1), the configuration section 140 transitions to dynamic mode if the amount of traffic being buffered for the legacy terminal 10 falls below a second threshold value. In this case, the state of the configuration mode transitions from state ST1 to state ST2, and then to state ST3. As a result of the configuration mode returning to dynamic mode in this way, making the link direction configuration of the dynamic TDD terminal 30 more rapidly track variations in UL-DL traffic ratio becomes possible again.

<3. Process Flow Examples>

[3-1. Terminal-side Process]

Figure 22:
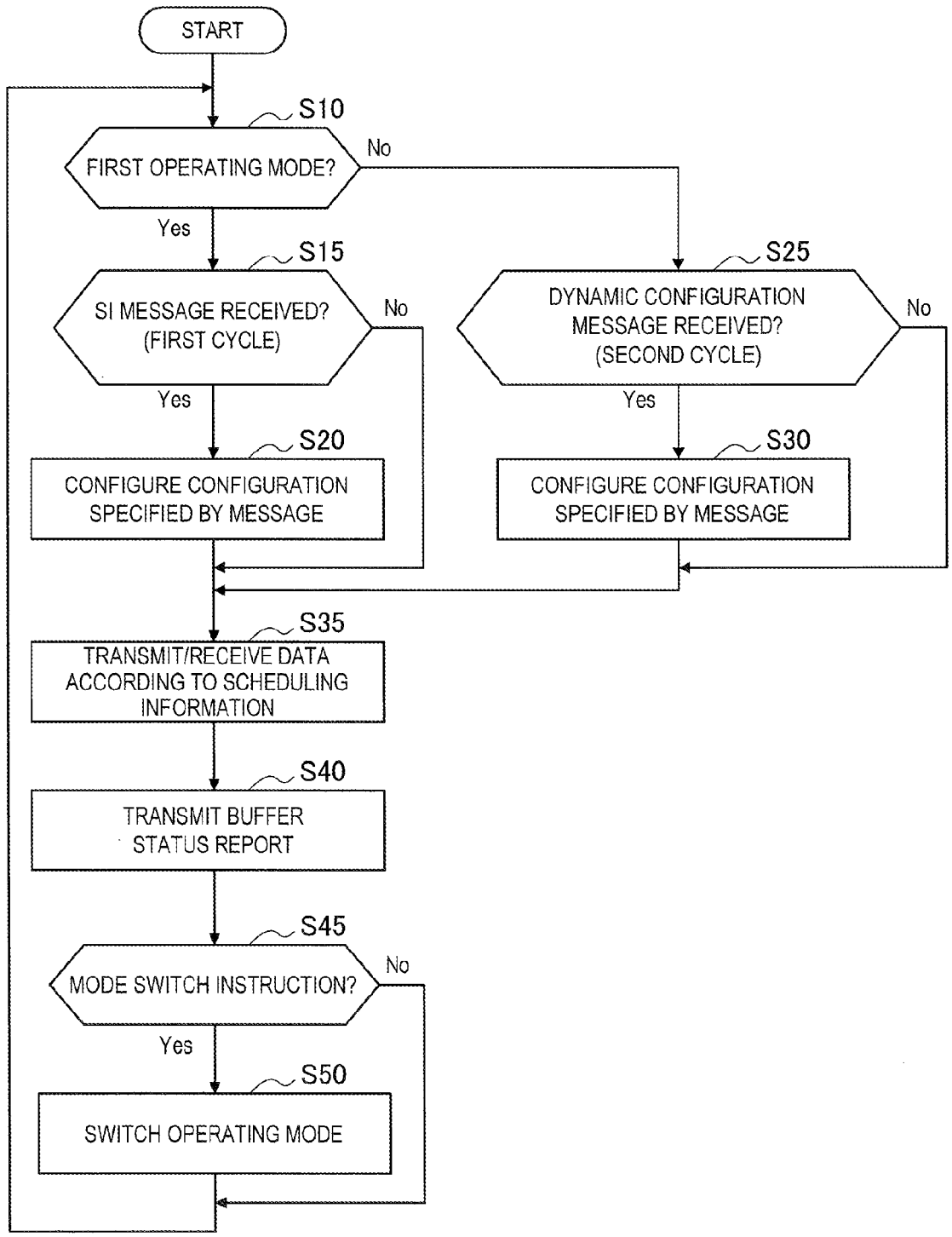
FIG. 22 is a flowchart illustrating an example of a flow of a communication process executed by a dynamic TDD terminal.

FIG. 22 is a flowchart illustrating an example of a flow of a communication process executed by the dynamic TDD terminal 30. Note that the following supposes that the dynamic TDD terminal 30 is a dual mode terminal discussed earlier.

The communication process in FIG. 22 first branches according to whether the dynamic TDD terminal 30 is operating in the first operating mode or the second operating mode (step S10). If the dynamic TDD terminal 30 is operating in the first operating mode, the process proceeds to step S15. On the other hand, if the dynamic TDD terminal 30 is operating in the second operating mode, the process proceeds to step S25.

In the first operating mode, the control section 33 causes the radio communication section 31 to receive an SI message on a first signaling cycle (step S15). Subsequently, when the radio communication section 31 receives an SI message, the control section 33 configures the link direction configuration specified by the SI message (that is, the legacy configuration) in the radio communication section 31 and the signal processing section 32 (step S20).

On the other hand, in the second operating mode, the control section 33 causes the radio communication section 31 to receive a dynamic configuration message on a shorter second signaling cycle (step S25). Subsequently, when the radio communication section 31 receives a dynamic configuration message, the control section 33 configures the link direction configuration specified by the dynamic configuration message (that is, the dynamic TDD configuration) in the radio communication section 31 and the signal processing section 32 (step S30).

In addition, the control section 33 causes the radio communication section 31 to receive a downlink data signal according to scheduling information received by the radio communication section 31, or causes an uplink data signal to be transmitted from the radio communication section 31 (step S35). Also, the radio communication section 31 transmits to the base station 100 a buffer status report indicating the amount of uplink traffic being buffered (step S40).

Next, the control section 33 determines whether or not an instruction to switch the operating mode was received from the base station 100 (step S45). At this point, if an instruction to switch the operating mode was received, the control section 33 switches the current operating mode to another operating mode (step S50). Subsequently, the communication process in FIG. 22 returns to step S10.

[3-2. Network-side Process]

(1) First Technique

Figure 23A:
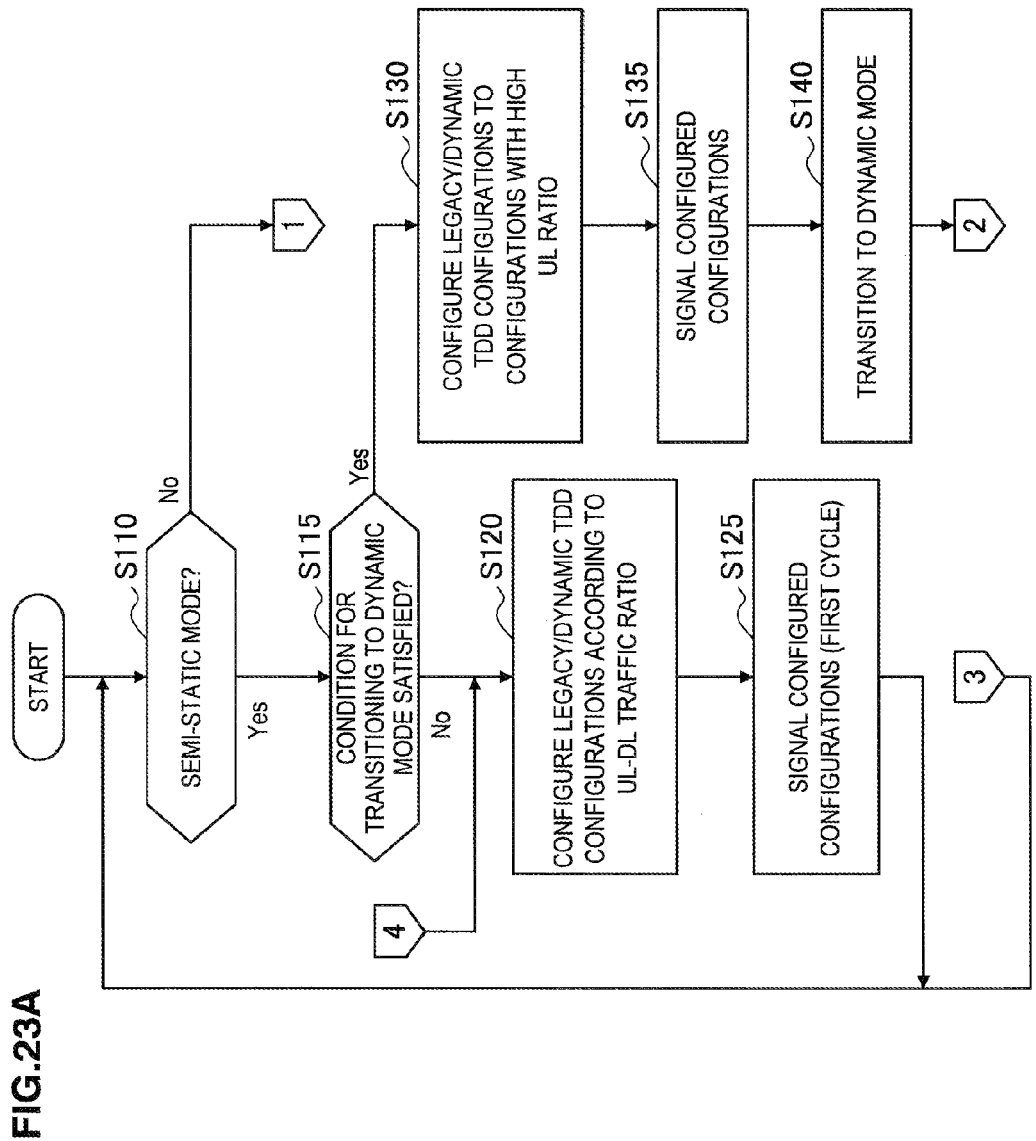
FIG. 23A is the first part of a flowchart illustrating an example of a flow of a communication control process executed according to the first technique.

FIGS. 23A and 23B are flowcharts illustrating an example of a flow of a communication control process executed by the base station 100 according to the first technique.

Referring to FIG. 23A, the communication control process first branches according to whether the base station 100 is operating in semi-static mode or dynamic mode (step S110). If the base station 100 is operating in semi-static mode, the process proceeds to step S115. On the other hand, if the base station 100 is operating in dynamic mode, the process proceeds to step S155 in FIG. 23B.

In step S115, the configuration section 140 determines whether or not a condition for transitioning to dynamic mode is satisfied (step S115). At this point, if the condition for transitioning to dynamic mode is not satisfied, semi-static mode is maintained, and the process proceeds to step S120. On the other hand, if the condition for transitioning to dynamic mode is satisfied, the process proceeds to step S130.

In step S120, the configuration section 140 configures the legacy configuration and the dynamic TDD configuration according to the UL-DL traffic ratio (step S120). Ordinarily, a common link direction configuration with a high downlink ratio may be selected. Next, the signaling control section 150 signals the configured link direction configurations to the legacy terminal 10 and the dynamic TDD terminal 30 (step S125). The process in step S120 and step S125 is conducted on the signaling cycle C1, which may correspond to 640 ms or 320 ms.

In step S130, the configuration section 140 configures the legacy configuration and the dynamic TDD configuration to link direction configurations with a high uplink ratio (step S130). Next, the signaling control section 150 signals the configured link direction configurations to the legacy terminal 10 and the dynamic TDD terminal 30 (step S135). Subsequently, the configured mode transitions to dynamic mode, and the process proceeds to step S160 in FIG. 23B (step S140).

Referring to FIG. 23B, in step S155, the configuration section 140 determines whether or not a condition for transitioning to semi-static mode is satisfied (step S155). At this point, if the condition for transitioning to semi-static mode is not satisfied, dynamic mode is maintained, and the process proceeds to step S160. On the other hand, if the condition for transitioning to semi-static mode is satisfied, the process proceeds to step S170.

In step S160, the configuration section 140 configures the dynamic TDD configuration according to the UL-DL traffic ratio (step S160). The legacy configuration may not be updated. Next, the signaling control section 150 signals the configured dynamic TDD configuration to the dynamic TDD terminal 30 (step S165). The process in step S160 and step S165 is conducted on the signaling cycle C2, which may correspond to an integer multiple of 10 ms.

In step S170, the configuration section 140 configures the dynamic TDD configuration to the same link direction configuration as the legacy configuration (step S170). Next, the signaling control section 150 signals the configured dynamic TDD configuration to the dynamic TDD terminal 30 (step S175). Subsequently, the configured mode transitions to semi-static mode, and the process proceeds to step S120 in FIG. 23A (step S180).

(2) Second Technique

Figure 24A:
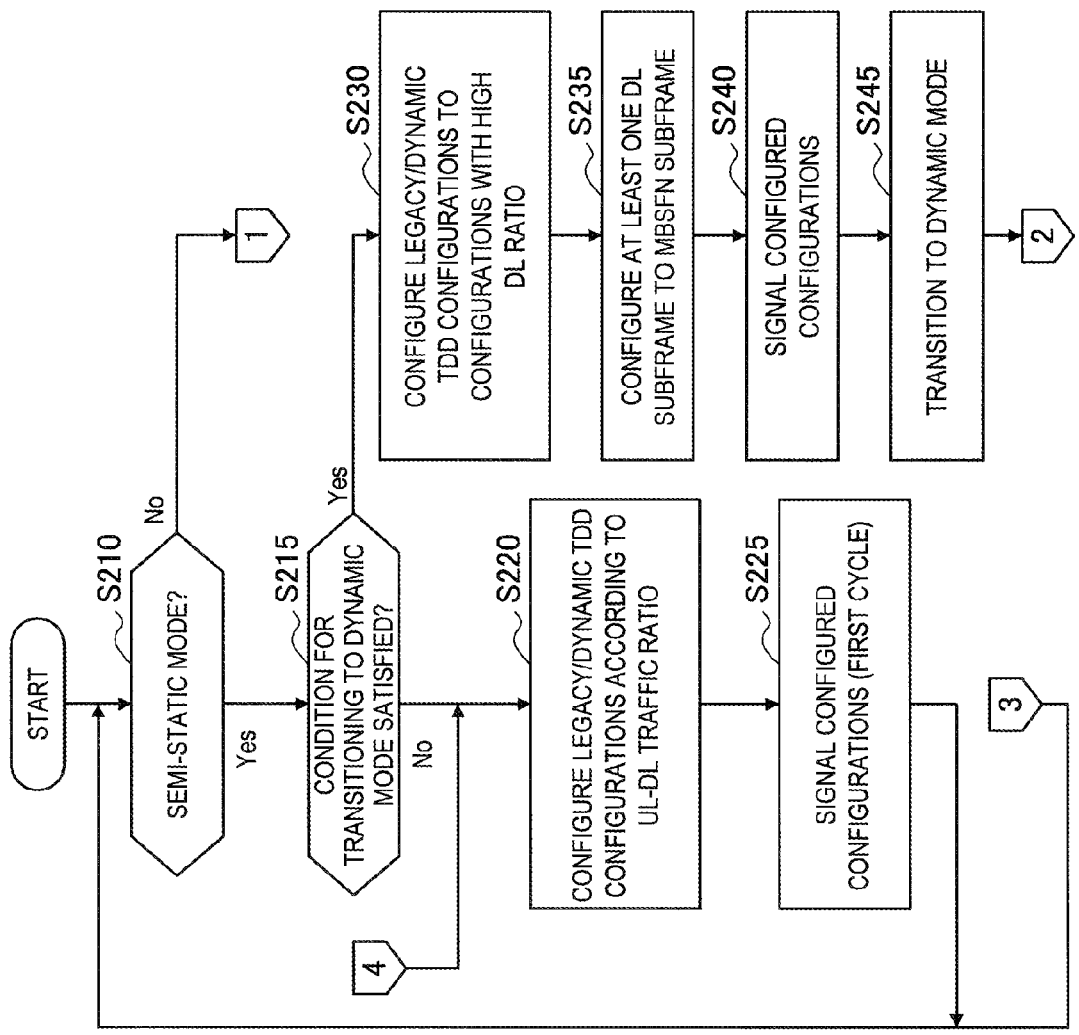
FIG. 24A is the first part of a flowchart illustrating an example of a flow of a communication control process executed according to the second technique.
Figure 24B:
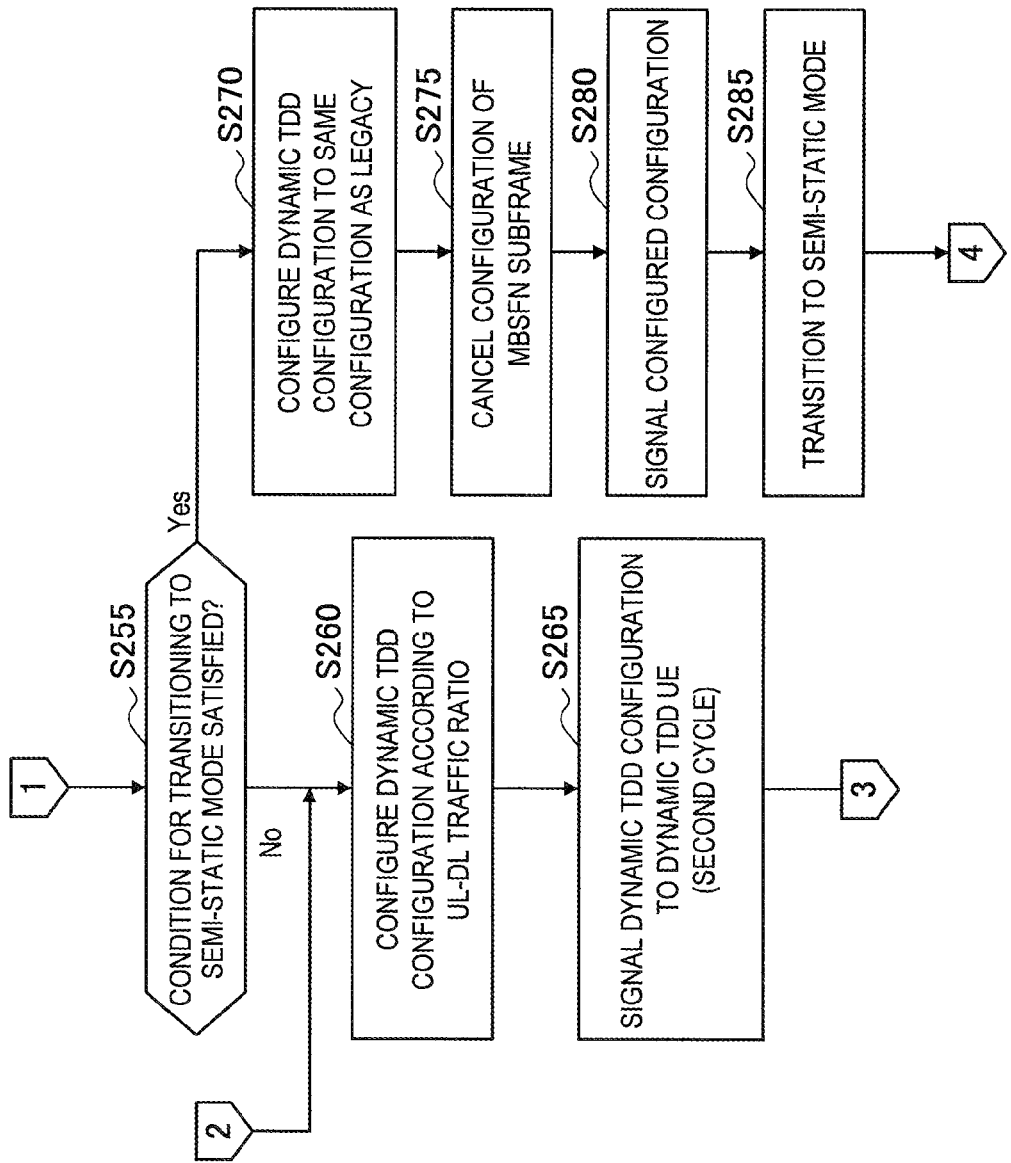
FIG. 24B is the first part of a flowchart illustrating an example of a flow of a communication control process executed according to the second technique.

FIGS. 24A and 24B are flowcharts illustrating an example of a flow of a communication control process executed by the base station 100 according to the second technique.

Referring to FIG. 24A, the communication control process first branches according to whether the base station 100 is operating in semi-static mode or dynamic mode (step S210). If the base station 100 is operating in semi-static mode, the process proceeds to step S215. On the other hand, if the base station 100 is operating in dynamic mode, the process proceeds to step S255 in FIG. 24B.

In step S215, the configuration section 140 determines whether or not a condition for transitioning to dynamic mode is satisfied (step S215). At this point, if the condition for transitioning to dynamic mode is not satisfied, semi-static mode is maintained, and the process proceeds to step S220. On the other hand, if the condition for transitioning to dynamic mode is satisfied, the process proceeds to step S230.

In step S220, the configuration section 140 configures the legacy configuration and the dynamic TDD configuration according to the UL-DL traffic ratio (step S220). Next, the signaling control section 150 signals the configured link direction configurations to the legacy terminal 10 and the dynamic TDD terminal 30 (step S225). The process in step S220 and step S225 is conducted on the signaling cycle C1, which may correspond to 640 ms or 320 ms.

In step S230, the configuration section 140 configures the legacy configuration and the dynamic TDD configuration to link direction configurations with a high downlink ratio (step S230). Next, the configuration section 140 configures at least one downlink subframe as an MBSFN subframe (step S235). Next, the signaling control section 150 signals the configured link direction configurations to the legacy terminal 10 and the dynamic TDD terminal 30 (step S240). Subsequently, the configured mode transitions to dynamic mode, and the process proceeds to step S260 in FIG. 24B (step S245).

Referring to FIG. 24B, in step S255, the configuration section 140 determines whether or not a condition for transitioning to semi-static mode is satisfied (step S255). At this point, if the condition for transitioning to semi-static mode is not satisfied, dynamic mode is maintained, and the process proceeds to step S260. On the other hand, if the condition for transitioning to semi-static mode is satisfied, the process proceeds to step S270.

In step S260, the configuration section 140 configures the dynamic TDD configuration according to the UL-DL traffic ratio (step S260). The legacy configuration may not be updated. Next, the signaling control section 150 signals the configured dynamic TDD configuration to the dynamic TDD terminal 30 (step S265). The process in step S260 and step S265 is conducted on the signaling cycle C2, which may correspond to an integer multiple of 10 ms.

In step S270, the configuration section 140 configures the dynamic TDD configuration to the same link direction configuration as the legacy configuration (step S270). Next, the configuration section 140 cancels the configuration of the MBSFN subframe (step S275). Next, the signaling control section 150 signals the configured dynamic TDD configuration to the dynamic TDD terminal 30 (step S280). Subsequently, the configured mode transitions to semi-static mode, and the process proceeds to step S220 in FIG. 24A (step S285).

<4. Conclusion>

The foregoing thus describes an embodiment of technology according to the present disclosure in detail using FIGS. 1 to 24B. According to the foregoing embodiment, a first link direction configuration (legacy configuration) is configured for a legacy terminal, and a second link direction configuration (dynamic TDD configuration) is configured for a dynamic TDD terminal. The first link direction configuration is signaled to the legacy terminal in the SIB. The second link direction configuration is signaled to the dynamic TDD terminal on a shorter cycle than the signaling cycle of the first link direction configuration. Consequently, it becomes possible to make the link direction configuration of the dynamic TDD terminal track variations in the UL-DL traffic ratio more rapidly than existing mechanisms. As a result, lowered resource utilization and lowered throughput caused by an increase in the amount of buffered traffic may be avoided or moderated, even in a radio communication environment with intense variations in the UL-DL traffic ratio.

Also, according to the foregoing embodiment, the dynamic TDD configuration may be selected from a set of configurations limited on the basis of the configured legacy configuration. As a result, it is possible to avoid lowered accuracy of synchronization tracking using the CRS in the legacy terminal caused by differences in the link direction configurations.

Also, according to the foregoing embodiment, if the amount of traffic being buffered for the legacy terminal exceeds a predetermined threshold value in dynamic mode, the configuration of a dynamic TDD configuration that differs from the legacy configuration is temporarily suspended. As a result, the buffered traffic for the legacy terminal may be resolved. After the traffic is resolved, the configuration mode for the link direction configurations returns to dynamic mode. As a result, it is possible to promote the rapid tracking of the dynamic TDD terminal link direction configuration in response to variations in the UL-DL traffic ratio, while also ensuring suitable buffer control for the legacy terminal.

In addition, according to the foregoing embodiment, the timing of an ACK/NACK transmitted from the legacy terminal or transmitted to the legacy terminal, or the timing of a UL grant transmitted to the legacy terminal, may be controlled so as to not be affected by link direction differences between the two configurations. Consequently, since the loss of an ACK/NACK or a UL grant caused by link direction differences may be avoided, radio resources may be used efficiently.

Note that several of the features described in this specification (such as the limitation of dynamic TDD configuration candidates based on the legacy configuration, the transition between dynamic mode and semi-static mode, and the switching of the operating mode of a dual mode terminal based on the UL-DL traffic ratio) may be combined with signaling of the dynamic TDD configuration using the SIB (SIB 1 or another type of SIB).

Also, compared to a macrocell, variations in the UL-DL traffic ratio are significantly more pronounced in a small cell with fewer terminals per cell (including nanocells, picocells, and femtocells). Consequently, the technology according to the present disclosure, in addition to being valuable for the control of radio communication in a macrocell, is also particularly effective for the control of radio communication in a small cell.

Note that the series of control processes conducted by the devices described in this specification may be realized in any of software, hardware, and a combination of software and hardware. A program constituting software is stored in advance in a non-transitory medium provided internally or externally to each device, for example. Each program is then loaded into random access memory (RAM) at runtime and executed by a processor such as a central processing unit (CPU), for example.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

Additionally, the present technology may also be configured as below.

(1)

A communication control device that controls radio communication conducted by one or more terminal devices according to a time-division duplex (TDD) scheme, the communication control device including:

a configuration section that configures, for each frame that includes a plurality of subframes, a link direction configuration expressing a link direction per subframe; and a control section that signals the link direction configuration configured by the configuration section to each terminal device, wherein the configuration section configures a first link direction configuration for a first terminal group, and configures a second link direction configuration for a second terminal group, and the control section signals the first link direction configuration to a terminal device belonging to the first terminal group on a first cycle, and signals the second link direction configuration to a terminal device belonging to the second terminal group on a second cycle that is shorter than the first cycle.

(2)

The image processing device according to (1), wherein
the control section signals the first link direction configuration in a system information block (SIB), and signals the second link direction configuration in a control information region having a shorter update cycle than the SIB.

(3)

The communication control device according to (2), wherein
the configuration section selects the second link direction configuration to configure from a set of configurations limited on the basis of the configured first link direction configuration.

(4)

The communication control device according to (3), wherein
the configuration section
configures a configuration with a higher uplink ratio as the first link direction configuration, and
configures a configuration derived by substituting an uplink subframe in the first link direction configuration with a downlink subframe as the second link direction configuration.

(5)

The communication control device according to (4), wherein
the communication control device further includes:
a scheduling section that does not grant uplink transmission to a terminal device belonging to the first terminal group in the uplink subframe substituted with the downlink subframe in the second link direction configuration.

(6)

The communication control device according to (5), wherein
the scheduling section schedules a downlink transmission to a terminal device belonging to the first terminal group only in a subframe for which a subframe for transmitting an ACK/NACK associated with the relevant downlink transmission is designated as the uplink subframe in the second link direction configuration.

(7)

The communication control device according to (5) or (6), further including
a storage section that stores a table associating, for each configuration candidate, a timing of an uplink transmission and a transmission timing of a corresponding uplink grant, wherein
the scheduling section decides a subframe for transmitting the uplink grant corresponding to an uplink transmission from a terminal device belonging to the first terminal group by referencing an entry about the first link direction configuration in the table.

(8)

The communication control device according to (5) or (6), further including
a storage section that stores a table associating, for each configuration candidate, a timing of an uplink transmission and a transmission timing of a corresponding ACK/NACK, wherein
the scheduling section decides a subframe for transmitting the ACK/NACK in response to an uplink transmission from a terminal device belonging to the first terminal group by referencing an entry about the first link direction configuration in the table.

(9)

The communication control device according to (3), wherein
the configuration section
configures a configuration with a higher downlink ratio as the first link direction configuration, and also configures at least one downlink subframe of the relevant first link direction configuration as an MBMS single frequency network (MBSFN) subframe, and
configures a configuration derived by substituting the MBSFN subframe in the first link direction configuration with an uplink subframe as the second link direction configuration.

(10)

The communication control device according to any one of (3) to (7), wherein
the configuration section
is able to operate in a dynamic mode in which the second link direction configuration different from the first link direction configuration is configurable, and a semi-static mode in which the second link direction configuration that is the same as the first link direction configuration is configured, and
while operating in the dynamic mode, transitions to the semi-static mode if an amount of traffic being buffered for the first terminal group exceeds a first threshold value.

(11)

The communication control device according to (10), wherein
while operating in the semi-static mode, the configuration section transitions to the dynamic mode if an amount of traffic being buffered for the first terminal group falls below a second threshold value.

(12)

The communication control device according to any one of (1) to (11), wherein
the configuration section selects the first link direction configuration and the second link direction configuration to configure in each frame on the basis of a ratio of the amount of traffic between uplink traffic and downlink traffic.

(13)

The communication control device according to (12), wherein
a terminal device belonging to the second terminal group is able to operate in a first operating mode in which a link direction configuration is updated on the first cycle, and a second operating mode in which a link direction configuration is updated on the second cycle, and
the control section instructs the terminal device belonging to the second terminal group to switch to the second operating mode if the ratio of the amount of traffic satisfies a predetermined condition.

(14)

The communication control device according to any one of (1) to (13), wherein
the communication control device is a base station, and
the base station further includes a radio communication section that transmits and receives radio signals in accordance with the second link direction configuration.

(15)

The communication control device according to any one of (1) to (13), wherein the communication control device is a control node that communicates with the one or more terminal devices via a base station.

(16)

A communication control method for controlling radio communication conducted by one or more terminal devices according to a time-division duplex (TDD) scheme in a communication control device, the communication control method including:

configuring, for each frame that includes a plurality of subframes, a first link direction configuration and a second link direction configuration expressing a link direction per subframe;

signaling the first link direction configuration to a terminal device belonging to a first terminal group on a first cycle; and signaling the second link direction configuration to a terminal device belonging to a second terminal group on a second cycle that is shorter than the first cycle.

(17)

A program for causing a computer of a communication control device that controls radio communication conducted by one or more terminal devices according to a time-division duplex (TDD) scheme to function as:

a configuration section that configures, for each frame that includes a plurality of subframes, a link direction configuration expressing a link direction per subframe; and a control section that signals the link direction configuration configured by the configuration section to each terminal device, wherein the configuration section configures a first link direction configuration for a first terminal group, and configures a second link direction configuration for a second terminal group, and the control section signals the first link direction configuration to a terminal device belonging to the first terminal group on a first cycle, and signals the second link direction configuration to a terminal device belonging to the second terminal group on a second cycle that is shorter than the first cycle.

(18)

A terminal device including:

a radio communication section that communicates with a base station according to a time-division duplex (TDD) scheme; and a control section that, according to a link direction configuration signaled from the base station, configures a link direction per subframe for each frame that includes a plurality of subframes, wherein the control section causes the radio communication section to receive a signaling of a second link direction configuration configured for a second terminal group to which the terminal device belongs on a signaling cycle that is shorter than a signaling cycle of a first link direction configuration configured for a first terminal group.

(19)

A communication control system including:

one or more terminal devices that conduct radio communication according to a time-division duplex (TDD) scheme; and a communication control device that controls the radio communication conducted by the one or more terminal devices, wherein the communication control device includes a configuration section that configures, for each frame that includes a plurality of subframes, a link direction configuration expressing a link direction per subframe, and a control section that signals the link direction configuration configured by the configuration section to each terminal device, wherein the configuration section configures a first link direction configuration for a first terminal group, and configures a second link direction configuration for a second terminal group, and the control section signals the first link direction configuration to a terminal device belonging to the first terminal group on a first cycle, and signals the second link direction configuration to a terminal device belonging to the second terminal group on a second cycle that is shorter than the first cycle.

REFERENCE SIGNS LIST 1 communication control system
10 terminal device (first terminal group: legacy terminal)
30 terminal device (second terminal group: dynamic TDD terminal)
31 radio communication section
33 control section
100 communication control device
110 radio communication section
140 configuration section
150 signaling control section
160 scheduling section
170 storage section

The invention claimed is:

1. A communication control device that controls radio communication conducted by one or more terminal devices according to a time-division duplex (TDD) scheme, the communication control device comprising:

a configuration section that configures, for each frame that includes a plurality of subframes, a link direction configuration expressing a link direction per subframe; and a control section that signals the link direction configuration configured by the configuration section to each terminal device, wherein the configuration section configures a first link direction configuration for a first terminal group, and configures a second link direction configuration for a second terminal group, and wherein the configuration section is able to operate in a dynamic mode in which the second link direction configuration is different from the first link direction configuration and is configurable, and in a semi-static mode in which the second link direction configuration that is the same as the first link direction configuration is configured, and while operating in the dynamic mode, transitions to the semi-static mode if an amount of traffic being buffered for the first terminal group exceeds a first threshold value, the control section signals the first link direction configuration to a terminal device belonging to the first terminal group on a first cycle, and signals the second link direction configuration to a terminal device belonging to the second terminal group on a second cycle that is shorter than the first cycle;

wherein the configuration section configures a configuration derived by substituting an uplink subframe in the first link direction configuration with a downlink subframe as the second link direction configuration.

2. The communication control device according to claim 1, wherein
the control section signals the first link direction configuration in a system information block (SIB), and signals the second link direction configuration in a control information region having a shorter update cycle than the SIB.

3. The communication control device according to claim 2, wherein
the configuration section selects the second link direction configuration to configure from a set of configurations limited on the basis of the configured first link direction configuration.

4. The communication control device according to claim 3, wherein
the configuration section
configures a configuration with a higher downlink ratio as the first link direction configuration, and also configures at least one downlink subframe of the relevant first link direction configuration as an MBMS single frequency network (MBSFN) subframe, and
configures a configuration derived by substituting the MBSFN subframe in the first link direction configuration with an uplink subframe as the second link direction configuration.

5. The communication control device according to claim 1, wherein
the configuration section
configures a configuration with a higher uplink ratio as the first link direction configuration.

6. The communication control device according to claim 1, wherein
the scheduling section schedules a downlink transmission to a terminal device belonging to the first terminal group only in a subframe for which a subframe for transmitting an ACK/NACK associated with the relevant downlink transmission is designated as the uplink subframe in the second link direction configuration.

7. The communication control device according to claim 1, further comprising
a storage section that stores a table associating, for each configuration candidate, a timing of an uplink transmission and a transmission timing of a corresponding uplink grant, wherein
the scheduling section decides a subframe for transmitting the uplink grant corresponding to an uplink transmission from a terminal device belonging to the first terminal group by referencing an entry about the first link direction configuration in the table.

8. The communication control device according to claim 1, further comprising
a storage section that stores a table associating, for each configuration candidate, a timing of an uplink transmission and a transmission timing of a corresponding ACK/NACK, wherein
the scheduling section decides a subframe for transmitting the ACK/NACK in response to an uplink transmission from a terminal device belonging to the first terminal group by referencing an entry about the first link direction configuration in the table.

9. The communication control device according to claim 1, wherein
while operating in the semi-static mode, the configuration section transitions to the dynamic mode if an amount of traffic being buffered for the first terminal group falls below a second threshold value.

10. The communication control device according to claim 1, wherein
the configuration section selects the first link direction configuration and the second link direction configuration to configure in each frame on the basis of a ratio of the amount of traffic between uplink traffic and downlink traffic.

11. The communication control device according to claim 10, wherein
a terminal device belonging to the second terminal group is able to operate in a first operating mode in which a link direction configuration is updated on the first cycle, and a second operating mode in which a link direction configuration is updated on the second cycle, and
the control section instructs the terminal device belonging to the second terminal group to switch to the second operating mode if the ratio of the amount of traffic satisfies a predetermined condition.

12. The communication control device according to claim 1, wherein
the communication control device is a base station, and
the base station further comprises a radio communication section that transmits and receives radio signals in accordance with the second link direction configuration.

13. The communication control device according to claim 1, wherein
the communication control device is a control node that communicates with the one or more terminal devices via a base station.

* * * * *